United States Patent
Kurosawa et al.

(10) Patent No.: US 10,581,364 B2
(45) Date of Patent: Mar. 3, 2020

(54) MOTOR DRIVE DEVICE AND MOTOR SYSTEM

(71) Applicant: RENESAS ELECTRONICS CORPORATION, Tokyo (JP)

(72) Inventors: Minoru Kurosawa, Tokyo (JP); Kichiya Itagaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/189,183

(22) Filed: Nov. 13, 2018

(65) Prior Publication Data

US 2019/0199265 A1 Jun. 27, 2019

(30) Foreign Application Priority Data

Dec. 26, 2017 (JP) .................................. 2017-250125

(51) Int. Cl.
| | |
|---|---|
| *H02P 6/182* | (2016.01) |
| *H02P 7/29* | (2016.01) |
| *H02P 27/08* | (2006.01) |
| *G11B 19/20* | (2006.01) |
| *H02M 7/5387* | (2007.01) |

(52) U.S. Cl.
CPC .......... *H02P 27/08* (2013.01); *G11B 19/2009* (2013.01); *H02M 7/53875* (2013.01); *H02P 6/182* (2013.01); *H02P 2209/09* (2013.01)

(58) Field of Classification Search
USPC ................................................ 318/504, 599
See application file for complete search history.

(56) References Cited

U.S. PATENT DOCUMENTS

| | | | | |
|---|---|---|---|---|
| 4,642,537 A | * | 2/1987 | Young ..................... | H02P 6/182 318/400.31 |
| 6,949,900 B1 | * | 9/2005 | Berringer ................. | H02P 6/08 318/400.03 |
| 2007/0069668 A1 | * | 3/2007 | MacKay ................... | H02P 6/10 318/400.34 |
| 2009/0146598 A1 | * | 6/2009 | Hayashi ................... | H02P 6/18 318/400.34 |
| 2010/0253265 A1 | * | 10/2010 | Clothier ................... | A47L 5/26 318/400.14 |
| 2010/0295490 A1 | * | 11/2010 | Kuroshima ............... | H02P 6/18 318/400.35 |
| 2017/0126155 A1 | | 5/2017 | Kurosawa et al. | |

FOREIGN PATENT DOCUMENTS

| | | |
|---|---|---|
| JP | 2003-111485 A | 4/2003 |
| JP | 2017-085799 A | 5/2017 |

* cited by examiner

*Primary Examiner* — Bentsu Ro
(74) *Attorney, Agent, or Firm* — McDermott Will & Emery LLP

(57) ABSTRACT

An output control unit controls a drive terminal for a BEMF detection object phase to a high-impedance state in a mask term. A BEMF detection unit detects a voltage of the drive terminal for the detection object phase when a center tap voltage is set as a reference as BEMF in a PWM on-term for remaining two phases per PWM period in the mask term and asserts a zero-crossing signal when the voltage is reduced to zero. A PWM fixing unit fixes the remaining two phases to the PWM on-terms in a first term from a predetermined timing after an amplitude level of BEMF becomes smaller than a BEMF threshold amplitude to assertion of the zero-crossing signal. The BEMF detection unit continuously detects BEMF in the first term.

20 Claims, 16 Drawing Sheets

MOTOR DRIVE DEVICE AND MOTOR SYSTEM

CROSS-REFERENCE TO RELATED APPLICATIONS

The disclosure of Japanese Patent Application No. 2017-250125 filed on Dec. 26, 2017 including the specification, drawings and abstract is incorporated herein by reference in its entirety.

BACKGROUND

The present invention relates to a motor drive device and a motor system and relates to, for example, a technology for detecting the position of a sensor-less motor.

In Japanese Unexamined Patent Application Publication No. 2003-111485, a motor drive control circuit which is equipped with a current control loop which controls motor currents and a PLL control loop which determines a motor electric-conduction timing is indicated. In order to generate the electric-conduction timing which is synchronous with a back electromotive voltage (BEMF (back electromotive force)) by using the PLL control loop, a mask term (a non-electric-conduction term) which reflects the electric-conduction timing concerned is provided in a predetermined phase. The PLL control loop detects a zero-crossing timing of the back electromotive voltage while observing the back electromotive voltage of the predetermined phase in the mask term and updates the conduction timing in such a manner that the zero-crossing timing concerned is maintained at the center of the mask term.

In Japanese Unexamined Patent Application Publication No. 2017-85799, a motor drive device which drives a three-phase motor using sine waves is indicated. The motor drive device concerned partitions one period (an electrical angle of 360 deg) of the sine wave into respective 60-deg terms, fixes a terminal voltage of one phase in three phases to a power supply voltage or a ground power supply voltage in each term and controls terminal voltages of the remaining two phases with PWM signals.

SUMMARY

For example, in a motor system for a hard disk drive (abbreviated as HDD in the specification) and so forth, it is requested to reduce rotation jitter of a motor in order to improve a recording density in association with capacity enlargement. It is necessary to detect the position of the motor with high accuracy (and eventually to generate a highly accurate electric-conduction timing on the basis of it) in order to reduce the rotation jitter. As a system for detecting the position of the motor, a system for detecting the zero-crossing timing of the back electromotive voltage in the mask term is known as indicated in Japanese Unexamined Patent Application Publication No. 2003-111485.

In a case where the system concerned is used, a term which allows detection of the back electromotive voltage is the mask term (the non-electric-conduction term). However, describing in more detail, it is limited to a term that both of PWM signals of two electric-conduction phases except the non-electric-conduction phase reach on-levels in each PWM (Pulse Width Modulation) period included in the mask term. Therefore, such processing that the back electromotive voltage of the non-electric-conduction phase is sampled in the on-level term of the two electric-conduction phases concerned is performed per PWM period in reality. As a result, it is feared that a variation which is equivalent to a sampling interval may occur in the zero-crossing timing. This variation may induce an increase in rotation jitter.

Embodiments which will be described later have been made in view of such circumstances and other issues and novel features will become apparent from the description of the present specification and the appended drawings.

A motor drive device according to one embodiment has drive terminals for three phases which drive a three-phase motor, a three-phase driver which is equipped with high-side transistors and low-side transistors for three phases, an output control unit, a back electromotive voltage detection unit and a PWM fixing unit. The output control unit controls the remaining two phases with the PWM signals in a state where the drive terminal of a back electromotive voltage detection object phase is controlled to a high-impedance state in a mask term. The back electromotive voltage detection unit detects a voltage of the drive terminal for the detection object phase when a center tap voltage of the three-phase motor is set as a reference as the back electromotive voltage in a PWM on-term of the remaining two phases per PWM period included in the mask term and asserts a zero-crossing signal in a case where it is reduced to zero. The PWM fixing unit fixes the remaining two phases to the PWM on-term in a first term from a predetermined timing after an amplitude level of the back electromotive voltage becomes smaller than a predetermined threshold amplitude to assertion of the zero-crossing signal. Here, the back electromotive voltage detection unit continuously detects the back electromotive voltage in the first term.

According to the aforementioned one embodiment, it becomes possible to detect the position of the motor with high accuracy.

DETAILED DESCRIPTION

Although, in the following embodiments, description will be made by dividing it into a plurality of sections or embodiments when necessary for convenience, these are not unrelated to each other or one another and these are related to each other or one another such that one covers some or all of modified examples, details, supplemental explanation and so forth of the other except where clearly stated in particular. In addition, in the following embodiments, in a case where the number of constitutional elements and so forth (the number of units, numerical values, amounts/quantities, ranges and so forth are included) is referred to, it is not limited to the specific number and may be either at least the specific number or not more than the specific number except where clearly stated in particular and except where definitely limited to the specific number in principle and so forth.

Further, in the following embodiments, it goes without saying that the constitutional elements (element steps and so forth are also included) thereof are not necessarily essential except where clearly stated in particular and except where clearly thought to be essential in principle. Likewise, in the following embodiments, when the shapes of the constitutional elements and so forth, a positional relationship between/among them and so forth are referred to, the ones which are substantially approximate to or similar to the shapes thereof and so forth shall be included except where clearly stated in particular and except where clearly thought that they are not so in principle. The same is true of the above-mentioned numerical values and the ranges.

In addition, although not limited in particular, circuit elements which configure each functional block of the embodiments are formed on a substrate made of a semiconductor such as monocrystalline silicon and so forth by a well-known technology of integrated circuits such as a CMOS (a complementary MOS transistor) and so forth. In the specification, an n-channel type MOSFET (Metal Oxide Semiconductor Field Effect Transistor) will be called an nMOS transistor and a p-channel type MOSFET (Metal Oxide Semiconductor Field Effect Transistor) will be called a pMOS transistor.

In the following, embodiments of the present invention will be described in detail on the basis of the drawings. Incidentally, in all the drawings used for description of the embodiments, the same numerals are assigned to the same members in principle and repetitive description thereof is omitted.

First Embodiment

«Outline of Motor System»

Figure 1:
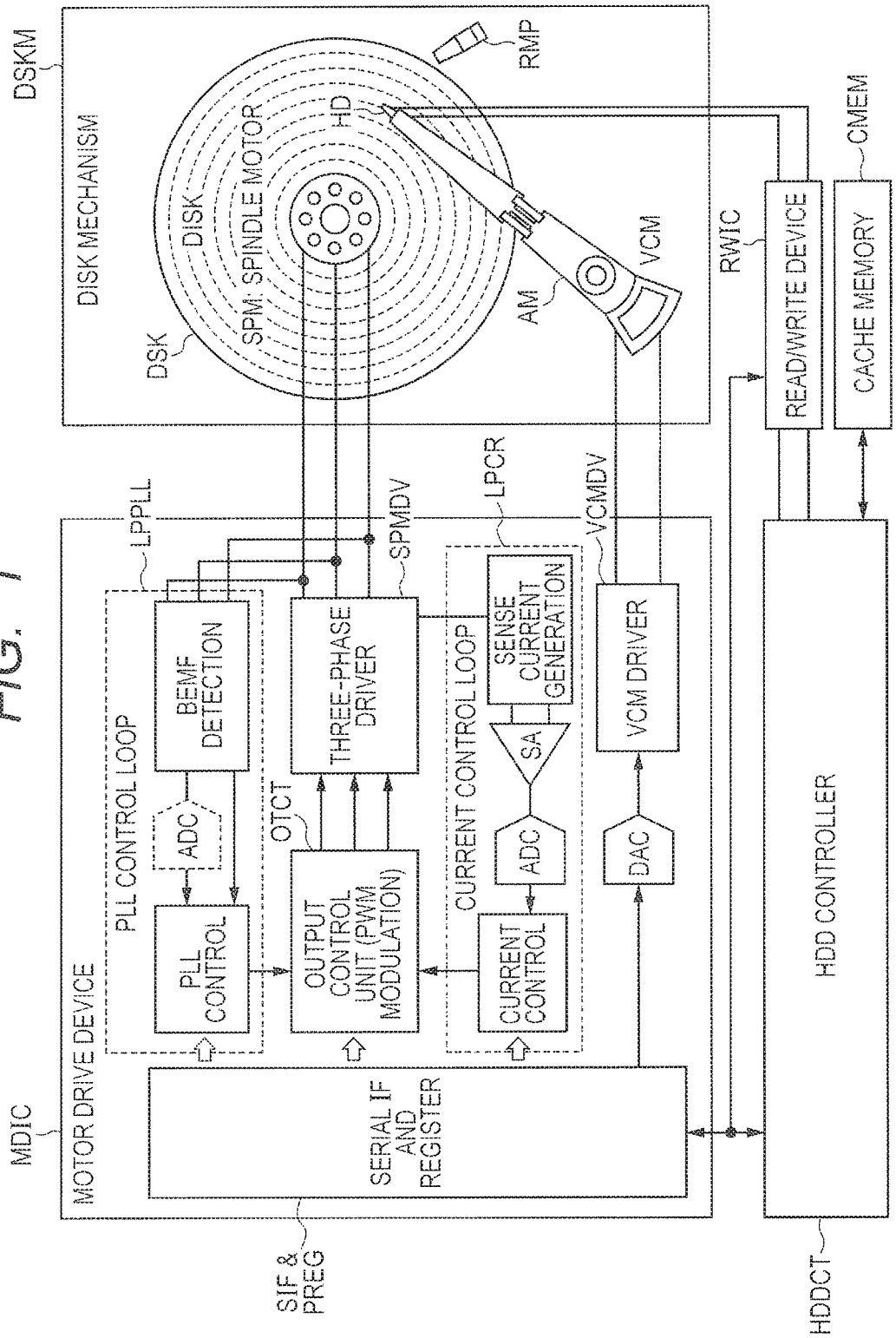
FIG. 1 is a block diagram illustrating one schematic configuration example of a motor system according to a first embodiment of the present invention.

FIG. 1 is a block diagram illustrating one schematic configuration example of a motor system according to the first embodiment of the present invention. A configuration example of a hard disk drive (HDD) apparatus is illustrated as one example of the motor system in FIG. 1. The HDD apparatus in FIG. 1 is equipped with an HDD controller HDDCT, a cache memory CMEM, a read/write device RWIC, a motor drive device MDIC and a disk mechanism DSKM. The HDD controller HDDCT is configured by, for example, a System-on-a-Chip (SoC) and so forth including a processor and so forth. The cache memory CMEM and the read/write device RWIC are configured by, for example, mutually different semiconductor chips.

The disk mechanism DSKM is equipped with a disk (here, a hard disk) DSK, a three-phase spindle motor (in the following, called a three-phase motor) SPM, a head HD, an arm mechanism AM, a voice coil motor VCM and a ramp mechanism RMP. The three-phase motor SPM rotationally drives the disk DSK. The voice coil motor VCM controls a position of the head HD in a radial direction of the disk DSK via the arm mechanism AM. The head HD performs data reading/writing on the disk DSK at a predetermined position which is determined by the voice coil motor VCM. The ramp mechanism RMP serves as a retraction place for the head HD in a case where data reading/writing is not executed.

The motor drive device MDIC is configured by, for example, one semiconductor chip. The motor drive device MDIC is equipped with a digital-to-analog converter DAC and a VCM driver VCMDV in order to drive the voice coil motor VCM. In addition, the motor drive device MDIC is equipped with a PLL control loop LPPLL, a current control loop LPCR, an output control unit OTCT and a three-phase driver SPMDV in order to drive the three-phase motor SPM. Further, the motor drive device MDIC is equipped with a serial interface SIF and a parameter setting register PREG in order to set driving conditions and so forth of the three-phase motor SPM and the voice coil motor VCM.

The PLL control loop LPPLL detects a position of the three-phase motor SPM by detecting a back electromotive voltage (also called BEMF in the specification) of the three-phase motor SPM and generates a conduction timing which is synchronous with BEMF by using PLL control. The current control loop LPCR detects the current flowing into the three-phase driver SPMDV by using a sense current generation circuit, a sense amplifier SA, an analog-to-digital converter ADC and so forth and calculates an error between the detected current concerned and a current indicated value which is set in the parameter setting register PREG. The current control loop LPCR determines a PWM duty for generation of a sine wave voltage (a sine wave current) which has an amplitude which reflects the error concerned on the basis of the calculated error and sine wave pattern data which is incorporated thereinto in advance per PWM period.

The output control unit OTCT generates PWM signals for the three phases on the basis of the PWM duty from the current control loop LPCR and switchingly controls the three-phase driver SPMDV using the PWM signals for the three phases concerned at an appropriate timing which is based on the electric-conduction timing from the PLL control loop LPPLL. As a result, the three-phase motor SPM is driven with sine wave currents for the three phases which are synchronous with BEMF.

The read/write device RWIC drives the head HD and makes the head HD perform data reading/writing. The HDD controller HDDCT performs control of the whole HDD apparatus. The HDD controller HDDCT performs communication between it and, for example, the motor drive device MDIC via the serial interface SIF and thereby indicates the driving conditions and so forth of the three-phase motor SPM and the voice coil motor VCM to the motor drive device MDIC. The current indicated value to the current control loop LPCR is included in the driving conditions. In addition, the HDD controller HDDCT indicates data reading/writing to the read/write device RWIC. In this case, data whose writing is indicated to the read/write device RWIC and data which is read out of the head HD via the read/write device RWIC are held in the cache memory CMEM.

Next, an overall operation of the HDD apparatus concerned will be briefly described. When a start-up command for the three-phase motor SPM is received from the HDD controller HDDCT, the motor drive device MDIC controls the three-phase motor SPM (that is, the disk DSK) so as to reach steady rotation at a target rotational speed while increasing the rotational speed stepwise. In steady rotation, the three-phase motor SPM is driven with the sine wave currents for the three phases. In this case, the amplitude and the phase (frequency) of each sine wave current are controlled by the current control loop LPCR and the PLL control loop LPPLL respectively. After the three-phase motor SPM reaches the steady rotation, the VCM drive unit VCMDV moves the head HD onto the disk DSK and the head HD performs data reading/writing on the disk DSK.

In such a motor system, a reduction in rotation jitter is requested in addition to high efficiency. In particular, in the HDD apparatus, improvement of the recording density is promoted by reducing the rotation jitter and eventually capacity enlargement is promoted. It is necessary to detect the position of the three-phase motor with high accuracy in order to reduce the rotation jitter. Therefore, in FIG. 1, the analog-to-digital converter ADC is arranged in the PLL control loop LPPLL. Although details will be described later, the analog-to-digital converter ADC concerned monitors the amplitude of BEMF for highly accurate detection of a zero-crossing timing of BEMF. Incidentally, it is also possible to commonize the analog-to-digital converter ADC concerned with an analog-to-digital converter ADC in the current control loop LPCR for circuit scale reduction.

«Schematic Configuration of Motor Drive Device (Comparative Example)»

Figure 10:
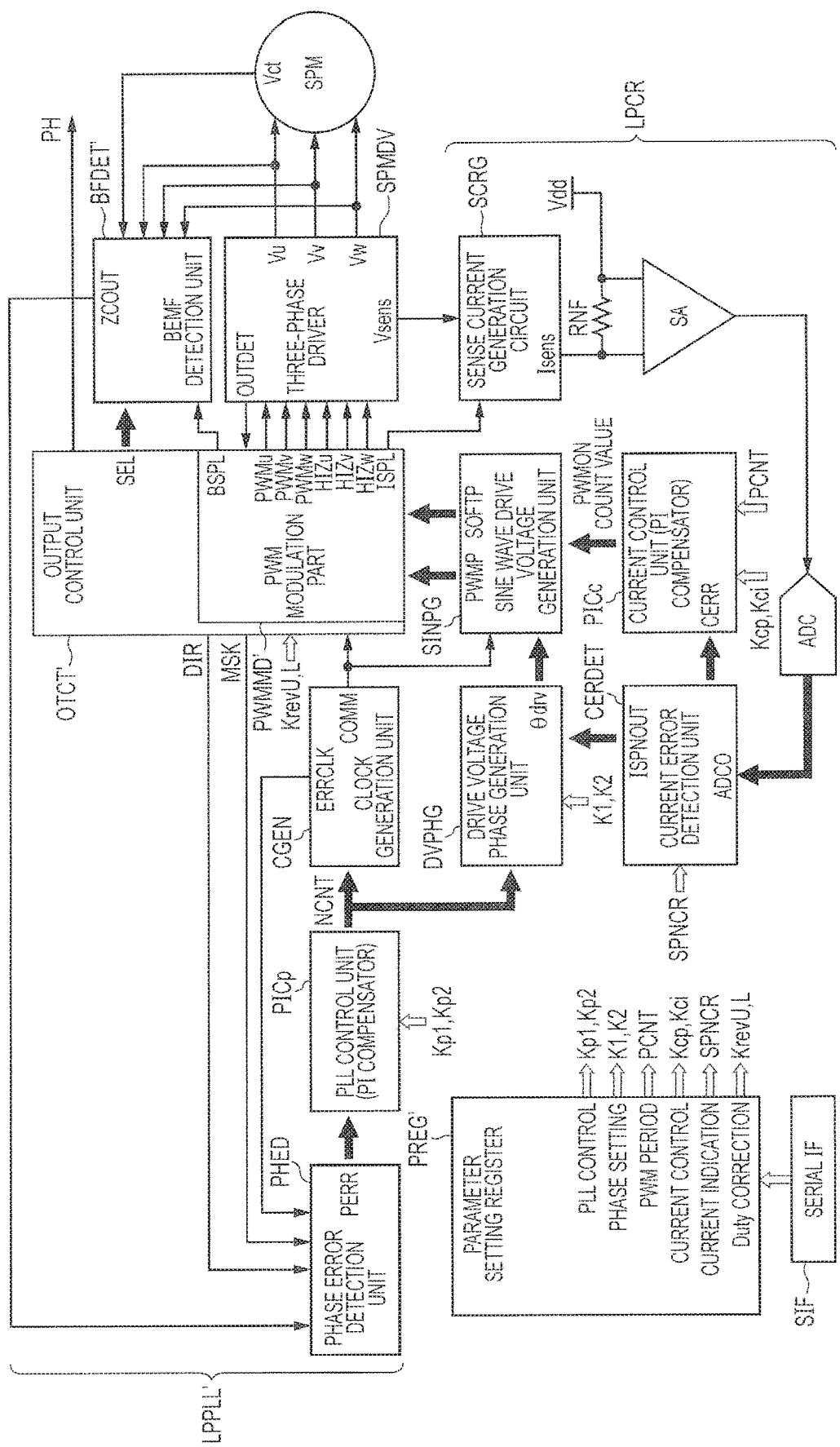
FIG. 10 is a block diagram illustrating one schematic configuration example of a motor drive device of a comparative example of the present invention.
Figure 11:
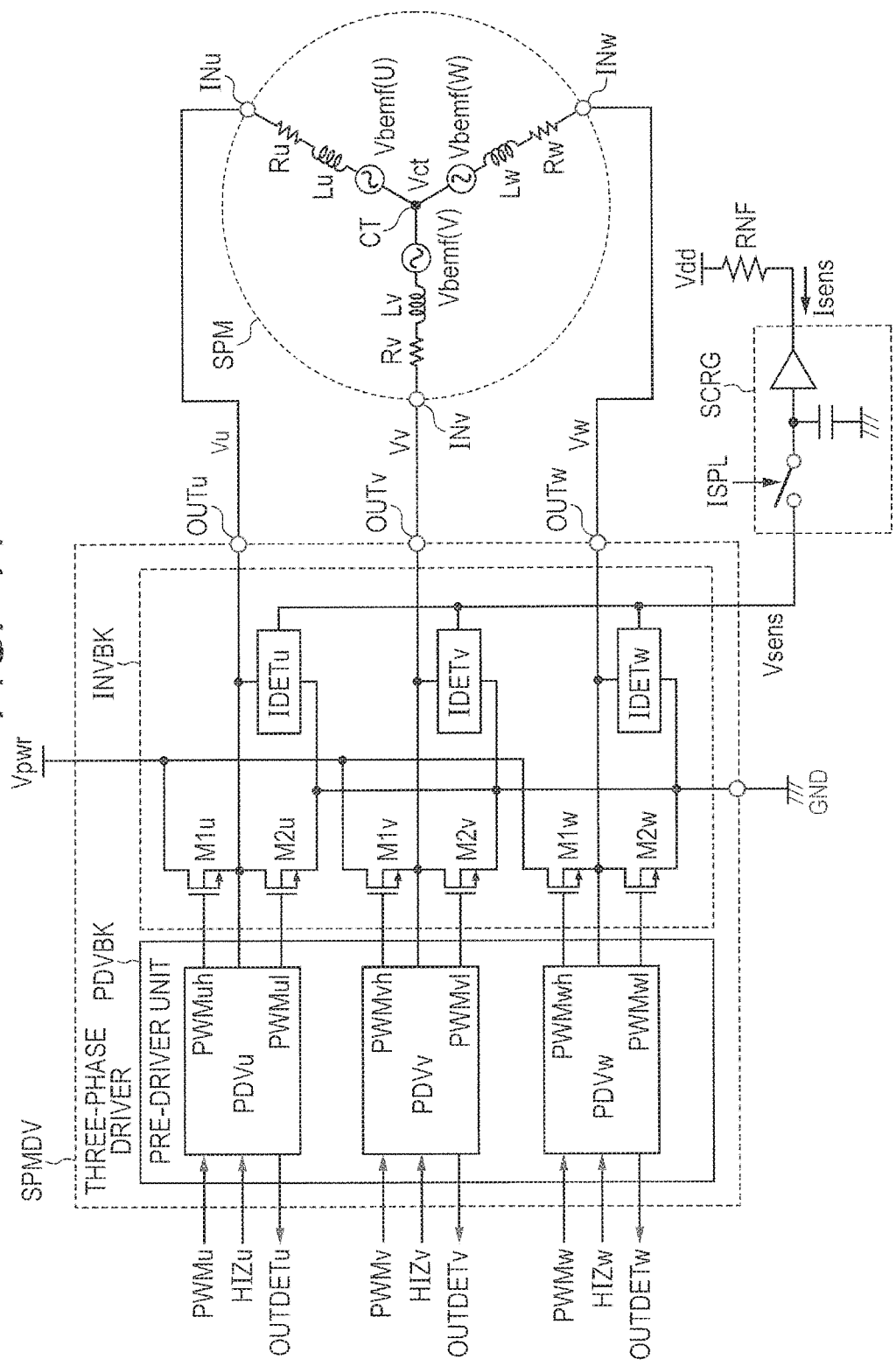
FIG. 11 is a circuit diagram illustrating one configuration example around a three-phase driver in FIG. 10.

Here, prior to description of the motor drive devices according to the embodiments, a motor drive device in the comparative example will be described. FIG. 10 is a block diagram illustrating one schematic configuration example of the motor drive device in the comparative example of the present invention. FIG. 11 is a circuit diagram illustrating one configuration example around a three-phase driver in FIG. 10. The motor drive device illustrated in FIG. 10 is equipped with a PLL control loop LPPLL', the current control loop LPCR, an output control unit OTCT', the three-phase driver SPMDV, the serial interface SIF and a parameter setting register PREG' as illustrated in FIG. 1. However, the analog-to-digital converter illustrated in FIG. 1 is not arranged in the PLL control loop LPPLL'.

As illustrated in FIG. 11, the three-phase driver SPMDV is equipped with a pre-driver unit PDVBK and an inverter unit INVBK. The inverter unit INVBK is equipped with high-side transistors M1$u$, M1$v$, M1$w$ and low-side transistors M2$u$, M2$v$, M2$w$ for the three phases and current detection circuits IDETu, IDETv, IDETw for the three phases. The high-side transistors M1$u$, M1$v$, M1$w$ and the low-side transistors M2$u$, M2$v$, M2$w$ for the three phases are configured by, for example, nMOS transistors and so forth.

The high-side transistors M1$u$, M1$v$, M1$w$ for the three phases are coupled between drive output terminals (drive terminals) OUTu, OUTv, OUTw for the three phases and a power supply voltage (high-potential-side power supply voltage) source Vpwr respectively. The low-side transistors M2$u$, M2$v$, M2$w$ for the three phases are coupled between the drive output terminals (drive terminals) OUTu, OUTv, OUTw for the three phases and a ground power supply voltage (low-potential-side power supply voltage) GND respectively. The current detection circuits IDETu, IDETu, IDETw for the three phases include transistors for sensing and so forth respectively, detect currents flowing in the low-side transistors for the respective phases and output sense voltages Vsens which are proportional to the detected currents to a common node.

The pre-driver unit PDVBK is equipped with pre-drivers PDVu, PDVv, PDVw for a u phase, a v phase and a w phase. The u-phase pre-driver PDVu complementarily drives the high-side transistor M1$u$ and the low-side transistor M2$u$ in accordance with a u-phase PWM signal PWMu from the output control unit OTCT' (specifically, a PWM modulation part PWMMD'). In addition, the u-phase pre-driver PDVu drives both of the high-side transistor M1$u$ and the low-side transistor M2$u$ to off-states and controls the u-phase drive output terminal OUTu to a high-impedance state in accordance with a u-phase high-impedance signal HIZu from the PWM modulation part PWMMD'. The high-impedance signal HIZu is used, for example, when detecting the u-phase BEMF.

Likewise, the v-phase pre-driver PDVv appropriately controls the high-side transistor M1$v$ and the low-side transistor M2$v$ in accordance with a v-phase PWM signal PWMv and a v-phase high-impedance signal HIZv from the PWM modulation part PWMMD'. Also, the w-phase pre-driver PDVw appropriately controls the high-side transistor M1$w$ and the low-side transistor M2$w$ in accordance with a w-phase PWM signal PWMw and a w-phase high-impedance signal HIZw from the PWM modulation part PWMMD'. In addition, the pre-drivers PDVu, PDVv, PDVw for the three phases generate output detection signals OUTDETu, OUTDETv, OUTDETw for the three phases by shaping actual signals generated at the drive output terminals OUTu, OUTv, OUTw for the three phases into pulse forms respectively.

In addition, one schematic configuration example of an equivalent circuit of the three-phase motor SPM and the sense current generation circuit SCRG is illustrated in FIG. 11. It is possible to express the three-phase motor SPM equivalently by resistors Ru, Rv, Rw, coils Lu, Lv, Lw and back electromotive voltages (BEMF) Vbemf(U), Vbemf(V), Vbemf(W) for the three phases. For example, when taking the u-phase by way of example, the resistor Ru, the coil Lu and the back electromotive voltage Vbemf(U) are coupled in series between a center tap CT and a u-phase drive input terminal INu. The same is true of the v phase and the w phase and resistors, coils and back electromotive voltage terminals for the corresponding phases are coupled in series between the center tap CT and drive input terminals Inv, INw for the corresponding phases.

The drive input terminals INu, INv, INw are coupled to the drive output terminals OUTu, OUTv, OUTw respectively. Here, in the specification, each of the drive input terminals INu, INv, INw and the drive output terminals OUTu, OUTv, OUTw will be also called a drive terminal. In addition, voltages of the u-phase drive terminals (OUTu, INu), the v-phase drive terminals (OUTv, INv) and the w-phase drive terminals (OUTw, INw) will be called drive terminal voltages Vu, Vv, Vw respectively and a voltage of the center tap CT will be called a center tap voltage Vct.

The sense current generation circuit SCRG samples the sense voltage Vsens from the three-phase driver SPMDV in accordance with a current sampling signal ISPL from the PWM modulation part PWMMD'. The sense current generation circuit SCRG generates a sense current Isens which is proportional to the sampled sense voltage Vsens by using a current amplifier and so forth and flows the sense current concerned to a current-detection-use resistor RNF.

In FIG. 10, the output control unit OTCT' is equipped with the PWM modulation part PWMMD'. As described in FIG. 11, the PWM modulation part PWMMD' outputs the PWM signals PWMu, PWMv, PWMw for the three phases and the high-impedance signals HIZu, HIZv, HIZw for the three phases to the three-phase driver SPMDV and outputs the current sampling signal ISPL to the sense current generation circuit SCRG. In addition, the PWM modulation part PWMMD' outputs a BEMF sampling signal BSPL to a BEMF detection unit BBFDETT'.

The output control unit OTCT' outputs a phase selection signal SEL, a BEMF polarity signal DIR, a mask signal MSK and a motor phase signal PH in addition to these signals. The phase selection signal SEL is a signal for selecting one phase in the three phases and is used, for example, when determining the detection object phase by the BEMF detection unit BFDET'. The BEMF polarity signal DIR is a signal which indicates whether transition of BEMF of the detection object phase is a positive direction or a negative direction. The mask signal MSK is a signal which is asserted in a predetermined term in which the zero-crossing timing of BEMF for the detection object phase would be present.

The motor phase signal PH is a clock signal which is synchronous with BEMF and is used, for example, when the HDD controller HDDCT in FIG. 1 detects the rotational speed of the three-phase motor SPM and so forth. Specifically, the HDD controller HDDCT detects the rotational speed of the three-phase motor SPM, for example, on the basis of a frequency (or a period) of the motor phase signal PH, calculates a current indicated value (in other words, a torque value) SPNCR used for setting the rotational speed concerned to a target rotational speed and sets the calculated current indicated value SPNCR in the parameter setting register PREG.

The PLL control loop LPPLL' is equipped with the BEMF detection unit BFDET', a phase error detection unit PHED, a PLL control unit (specifically, a PI compensator) PICp and a clock generation unit CGEN. The BEMF detection unit BFDET' detects the zero-crossing timing of BEMF in the detection object phase which is based on the phase selection signal SEL. Here, a schematic method of detecting the zero-crossing timing will be described by taking a case where the detection object phase is the u phase by way of example.

First, the PWM modulation part PWMMD' sets the u-phase drive terminals (OUTu, INu) to the high-impedance states by using the high impedance signal HIZu in an assertion term (called a mask term) of the mask signal MSK. The BEMF detection unit BFDET' detects the u-phase drive terminal voltage Vu when the center tap voltage Vct is set as a reference as the u-phase BEMF at a sampling timing which is based on the BEMF sampling signal BSPL per PWM period included in the mask term concerned. Then, the BEMF detection unit BEDET' asserts a zero-crossing signal ZCOUT in a case where the detected BEMF is reduced to zero. Incidentally, although details will be described later, the sampling timing is asserted in a PWM on-term in each PWM period per PWM period.

The phase error detection unit PERR detects a phase error PERR between a specified timing in the mask term (in other words, a non-electric-conduction term of the detection object phase and a transition timing of the zero-crossing signal ZCOUT. Although, in the embodiment, the specified timing concerned is set to a center timing of the mask term, it is not necessarily limited to the center timing. The PI compensator PICp generates a rotation period count value NCNT which brings the phase error PHED concerned close to zero by proportional (P)/integral (I) control. The rotation period count value NCNT is a count value which is proportional to the rotation period of the three-phase motor SPM and the count value which determines, for example, a term which is equivalent to 60 deg in an electrical angle of 360 deg.

The clock generation unit CGEN generates a phase switch timing signal COMM having a period which is based on the rotation period count value NCNT and an error counter clock ERRCLK. The output control unit OTCT' controls an electric-conduction timing of the three-phase motor SPM on the basis of the phase switch timing signal COMM concerned and generates various signals including the aforementioned mask signal MSK on the basis of the electric-conduction timing concerned.

Thereby, it follows that the PLL control loop LPPLL' performs feedback control of the phase or the frequency of the phase switch timing signal (in other words, an electric-conduction-use timing signal) COMM in such a manner that the assertion timing of the zero-crossing signal ZCOUT is maintained at the specified timing (the center timing) in the mask period. As a result, the output control unit OTCT' is able to control the three-phase motor SPM at the electric-conduction timing which is synchronous with BEMF.

The current control loop LPCR is equipped with the sense current generation circuit SCRG, the current-detection-use resistor RNF, the sense amplifier SA, the analog-to-digital converter ADC, a current error detection unit CERDET, a current control unit (specifically, a PI compensator) PICc, a drive voltage phase generation unit DVPHG and a sine wave drive voltage generation unit SINPG. Detailed configuration and operation of the current control loop LPCR will be described later in FIG. 12 and therefore will be briefly described here.

As described in FIG. 11, the sense current Isens which is generated by the sense current generation circuit SCRG flows into the current-detection-use resistor RNF. The sense current Isens becomes a current which is proportional to the current flowing into each phase of the three-phase motor SPM. The sense amplifier SA amplifies a voltage across the current-detection-use resistor RNF and the analog-to-digital converter ADC converts an output voltage from the sense amplifier SA into a digital value ADCO.

The current error detection unit CERDET calculates a current error CERR between the digital signal ADCO and the current indicated value SPNCR and the PI compensator PICc determines a PWM on-count value for bringing the current error CERR concerned close to zero. The drive voltage phase generation unit DVPHG performs so-called spark advance control and calculates a drive voltage phase θdrv for compensation of a phase error between the drive current phase and the drive voltage phase of the three-phase motor SPM. The sine wave drive voltage generation unit SINPG generates duty indicated values PWMP, SOFTP for each PWM period on the basis of the PWM on-count value from the PI compensator PICc, the drive voltage phase θdrv from the drive voltage phase generation unit DVPHG and the phase switch timing signal COMM from the PLL control loop LPPLL'.

The parameter setting register PREG' holds various parameters (Kp1, Kp2, K1, K2, Kcp, Kci, Krev (U, L)), a PWM period count value PCNT and the current indicated value SPNCR. "Kp1", "Kp2" are control gains used in the PI compensator PICp for PLL control, "Kcp", "Kci" are control gains used in the PI compensator PICc for current control. Here, a control period for PLL control occurs per zero-crossing timing of BEMF and a control period for current control occurs per PWM period. Therefore, for example, the control gains Kp1, Kp2 are determined in such a manner that a control band for current control reaches about several hundred Hz and the control gains Kcp, Kci are determined in such a manner that a control band for current control reaches about several kHz to 10 kHz. "K1", "K2" are parameters which reflect a motor constant and are used for calculation of the drive voltage phase θdrv. "KrevU, L" is a parameter for duty correction and is used in the output control unit OTCT'.

«Details Around Current Control Loop»

Figure 12:
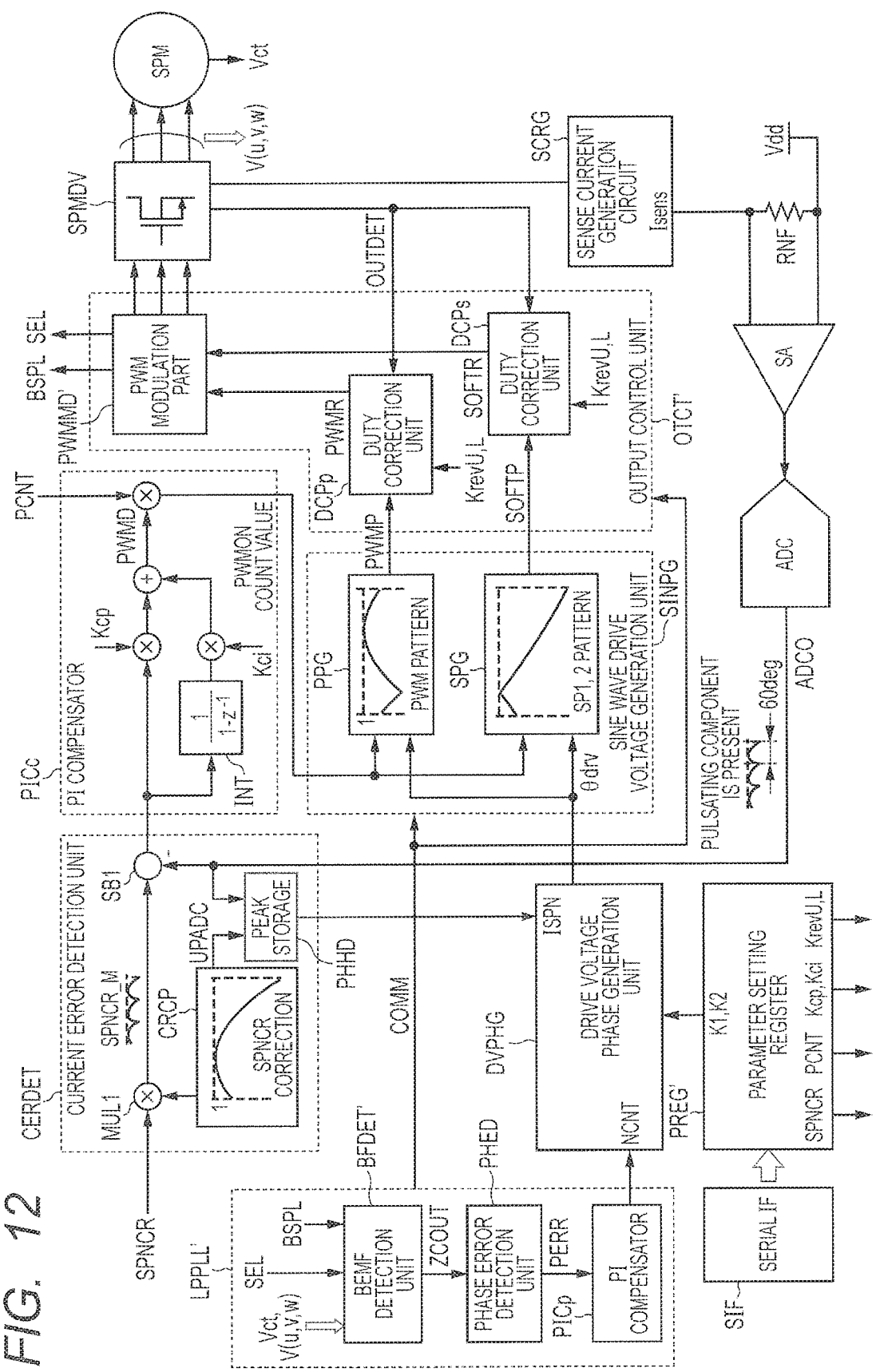
FIG. 12 is a block diagram illustrating one detailed configuration example around a current control loop in FIG. 10.

FIG. 12 is a block diagram illustrating one detailed configuration example around the current control loop in FIG. 10. In FIG. 12, the sense current generation circuit SCRG, the current-detection-use resistor RNF, the sense amplifier SA and the analog-to-digital converter ADC detect the respective drive currents for the three phases which flow into the low-side transistors for the three phases (eventually, the three-phase motor SPM) and output a result of detection as the digital value ADCO as described in FIG. 10. The current error detection unit CERDET detects a current error between the current indicated value SPNCR and the digital value ADCO from the analog-to-digital converter ADC by using a subtractor SB1.

The PI compensator PICc includes an integrator INT and calculates a PWM duty value PWMD which reflects the current error by performing PI control by using the current error detected by the current error detection unit CERDET as an input. The PI compensator PICc calculates a PWM on-count value by multiplying this WPM duty value PWMD and the PWM period count value PCNT together. In this case, the proportional gain Kcp and the integral gain Kci used in PI control, and the PWM period count value PCNT are held in the parameter setting register PREG'. The PWM period count value PCNT is a value that a time for one period of the PWM signal is converted to a count value and the PWM on-count value is a value that an on-term in one period of the PWM signal is converted to a count value.

The sine wave drive voltage generation unit SINPG receives the PWM on-count value from the PI compensator PICc and the phase switch timing signal COMM from the PLL control loop LPPLL' and generates the duty indicated values PWMP, SOFTP for each PWM period. The duty indicated values PWMP, SOFTP concerned become indicated values for applying the sine wave voltages of the three phases to the three-phase motor SPM and determining amplitudes of the sine wave voltages concerned to values according to the PWM on-count value.

Specifically, similarly to the system in Japanese Unexamined Patent Application Publication No. 2017-85799, the motor drive device concerned partitions one period (the electrical angle of 360 deg) of the sine wave into respective 60-deg terms, fixes the drive output terminal of one phase in the drive output terminals OUTu, OUTv, OUTw for the three phases to the power supply voltage Vpwr or the ground power supply voltage GND in each term and controls the remaining two phases with the PWM signals. The sine wave drive voltage generation unit SINPG determines duty patterns of the PWM signals for the remaining two phases (that is, how the duties are changed per PWM period in the 60-deg term).

Describing in detail, the sine wave drive voltage generation unit SINPG is equipped with a PWM pattern generation part PPG and a soft pattern (SP1, SP2) generation part SPG which include in advance normalization tables and so forth that the duty patterns are specified. The PWM pattern generation part PPG and the soft pattern generation part SPG generate the duty indicated values PWMP, SOFTP respectively by performing weighing which is based on the PWM on-count value on the values in the normalization tables concerned and so forth per PWM period.

The output control unit OTCT' is equipped with duty correction parts DCPp, DCPs and the PWM modulation part PWMMD'. The duty correction part DCPp detects a duty error which occurs between input and output of the three-phase driver SPMDV and generates an after-correction duty indicated value PWMR by adding a correction value for cancellation of the error concerned to the duty indicated value PWMP. Specifically, the duty correction part DCPp detects the actual duty by receiving an output detection signal OUTDET from the three-phase driver SPMDV and determines the correction value on the basis of a difference between this and the duty indicated value PWMP.

Further, the duty correction part DCPp determines the correction value on the basis of a predetermined arithmetic expression in a case where the duty indicated value PWMP is larger than the duty which is determined using the duty correction parameter KrevU, L. That is, in a case where the duty indicated value PWMP is large, there are cases where a correction value which is different from that in a case where the duty indicated value PWMP is small becomes necessary because ON-OFF of the transistor becomes insufficient. The duty correction part DCPp determines the correction value concerned on the basis of the arithmetic expression. The duty correction part SCPs generates an after-correction duty indicated value SOFTR by adding a predetermined correction value to the duty indicated value SOFTP similarly to the case of the duty correction part DCPp.

As illustrated in FIG. 10, the PWM modulation part PWMMD' controls the three-phase driver SPMDV by using the PWM signals PWMu, PWMv, PWMw and the high-impedance signals HIZu, HIZv, HIZw for the three phases. When driving the three-phase motor SPM at the sine wave voltage, the PWM modulation part PWMMD' fixes the high-side transistor or the low-side transistor of one phase (for example, the u phase) to the on-state per 60-deg term which is based on the phase switch timing signal COMM and thereby fixes the drive output terminal (OUTu) of one phase concerned to the power supply voltage Vpwr or the ground power supply voltage GND. Then, the PWM modulation part PWMMD' generates the PWM signals (PWMv, PWMw) for the remaining two phases (the v phase, the w phase) on the basis of the after-correction duty indicated values PWMR, SOFTR respectively.

The PWM modulation part PWMMD' controls the three-phase driver SPMDV while performing switching for each 60 deg in this way. In addition, since the drive current of the three-phase motor SPM is in the form of a sine-wave shape, such a pulsating component that the 60-deg period including the peak of the sine wave is repeated is included in the current detected by the current-detection-use resistor RNF as illustrated in FIG. 12. On the other hand, the current indicated value SPNCR is a direct-current component. Therefore, in a case where the current indicated value SPNCR is used as it is, it is feared that it may be impossible to detect the current error between it and the digital value ADCO with high accuracy. Accordingly, the current error detection unit CERDET is equipped with an indicated current correction part CRCP which generates a digital pattern obtained by replicating this sine waveform and a peak value storage part PKHD.

The current error detection unit CERDET multiplies the current indicated value SPNCR and the digital pattern from the indicated current correction circuit CRCP together by using a multiplier MUL1 and outputs a current indicated value SPNCR_M obtained after multiplication concerned to the subtractor SB1. In addition, the indicated current correction circuit CRCP outputs a trigger signal UPADC at a peak timing of the sine waveform and the peak value storage part PKHD latches the digital value ADCO as a drive current value ISPN in accordance with the trigger signal UPADC concerned. The drive current value ISPN concerned indicates the amplitude of the drive current.

The drive voltage phase generation unit DVPHG calculates the drive voltage phase θdrv by performing predetermined arithmetic operations by using the rotation period count value NCNT from the PLL control loop LPPLL', the drive current value ISPN from the current error detection unit CERDET and the parameters K1, K2 from the parameter setting register PREG. The sine wave drive voltage generation unit SINPG shifts the PWM pattern and the soft pastern by an electrical angle which is based on the drive voltage phase θdrv and generates the duty indicated values PWMP, SOFTP by using the shifted patterns.

That is, in the three-phase motor SPM, high efficiency is promoted by making the BEMP phase match the drive current phase. However, since the actual operation is voltage driving, it is necessary to control the drive voltage phase so as to make the BEMF phase match the drive current phase. Describing in detail, such control (called spark advance control) that the drive voltage is applied to the motor SPM in a phase which is more advanced than the BEMP phase by the drive voltage phase θdrv in accordance with various coefficients (a resistance component, an inductance component, the rotational speed, a back electromotive voltage constant, the drive current) of the three-phase motor SPM becomes necessary. Thus, the drive voltage phase generation unit DVPHG calculates the drive voltage phase θdrv on the basis of a specified arithmetic expression that these various coefficients are used as variables. On this occasion, the resistance component, the inductance component and the back electromotive voltage constant are determined with the parameters K1, K2, the rotational speed is determined with the rotation period count value NCNT and the drive current is determined with the drive current value ISPN.

«Details Around PLL Control Loop (Comparative Example)»

Figure 13:
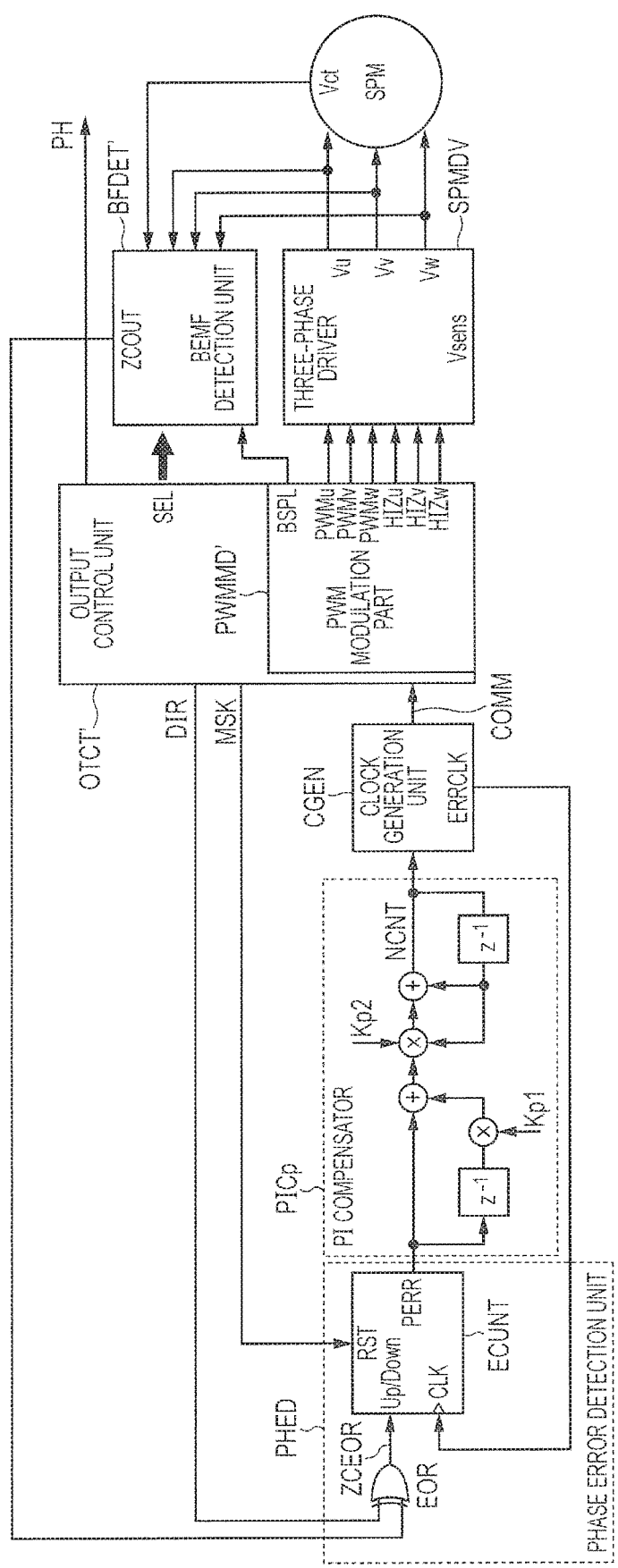
FIG. 13 is a block diagram illustrating one detailed configuration example around a PLL control loop in FIG. 10.
Figure 14:
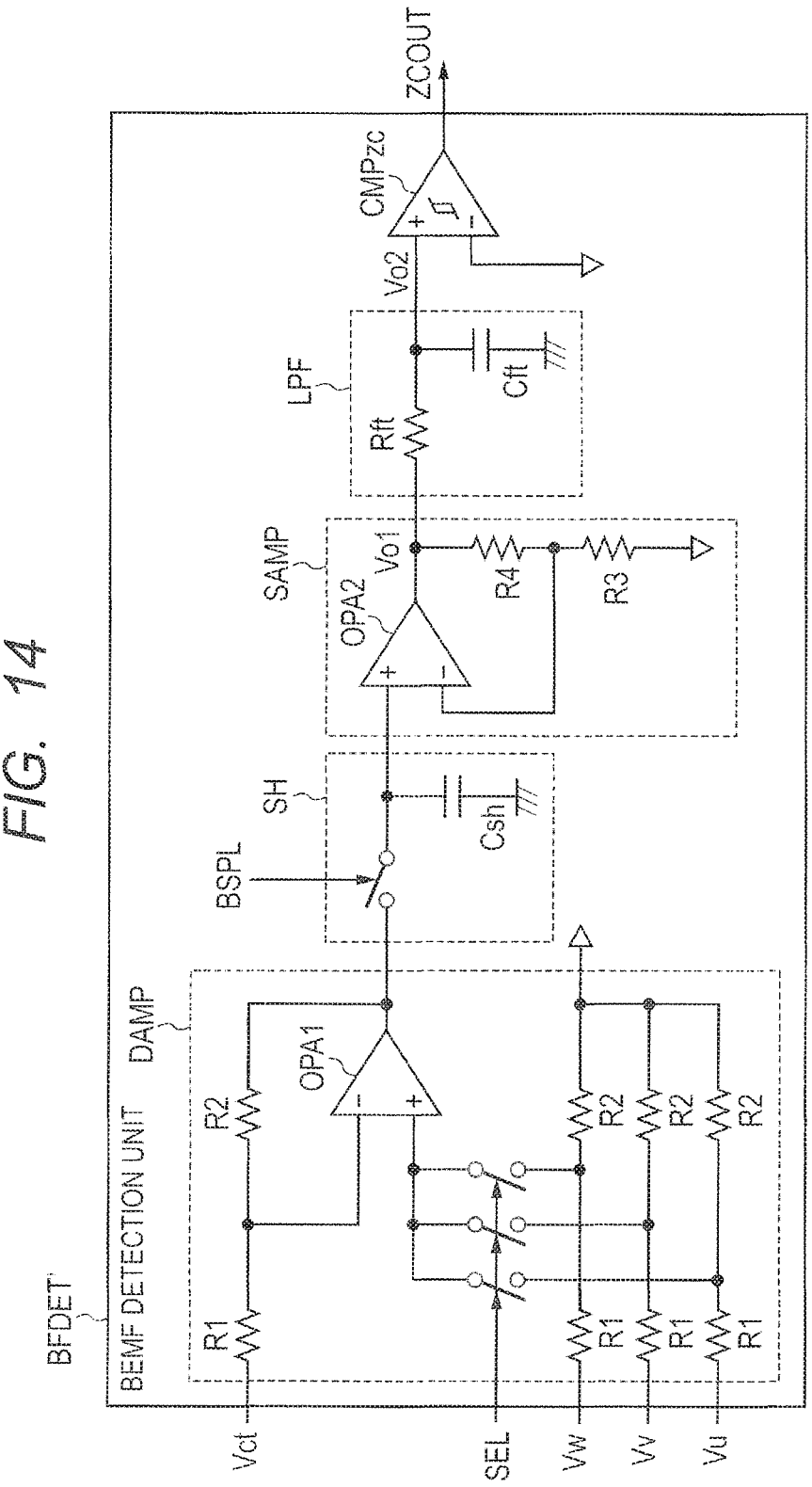
FIG. 14 is a circuit diagram illustrating one detailed configuration example of a BEMF detection unit in FIG. 13.

FIG. 13 is a block diagram illustrating one detailed configuration example around the PLL control loop in FIG. 10. FIG. 14 is a circuit diagram illustrating one detailed configuration example of the BEMF detection unit in FIG. 13. In FIG. 14, the BEMF detection unit BFDET' is equipped with a differential amplification circuit DAMP, a sample and hold circuit SH, an amplification circuit SAMP, a low-pass filter LPF and a comparator CMPzc. The differential amplification circuit DAMP includes an operational amplifier OPA1 and a plurality of groups of resistance elements R1, R2 and amplifies the drive terminal voltage (Vu, Vv, Vw) of a phase which is selected with the phase selection signal SEL using a gain which is based on resistance values of the resistance elements R1, R2 by setting the center tap voltage Vct as a reference.

The sample and hold circuit SH samples an output voltage from the differential amplification circuit DAMP concerned in accordance with the BEMF sampling signal BSPL and holds it in a capacity element Csh. The BEMF sampling signal BSPL is sequentially asserted per PWM period in the mask term. The amplification circuit SAMP includes an operational amplifier OPA2 and resistance elements R3, R4 and amplifies the voltage held in the capacity element Csh using a gain which is based on resistance values of the resistance elements R3, R4. The amplification circuit SAMP is provided in order to improve detection sensitivity of the rear-stage comparator CMPzc. However, it is also possible to eliminate the amplification circuit SAMP as the case may be.

The low-pass filter LPF includes a resistance element Rft and a capacity element Cft and filters an output voltage Vo1 from the amplification circuit SAMP. The low-pass filter LPF is provided in order to reduce a sampling error which occurs by sampling of BEMF and smoothes a stepped voltage which is held in the capacity element Csh in association with sampling. The comparator CMPzc generates the zero-cross signal ZCOUNT by comparing an output voltage Vo2 from the low-pass filter LPF with a zero voltage (the ground power supply voltage GND). In this example, in a case where the output voltage Vo2 is higher than the zero voltage, the comparator CMPzc outputs an "H" level. In addition, in this example, a hysteresis comparator is used for preventing the zero-crossing signal ZCOUNT from chattering.

In FIG. 13, the phase error detection unit PHED is equipped with an EXOR gate EOR and an error counter ECUNT. The EXOR gate EOR outputs a zero-crossing EOR signal ZCEOR by performing an EXOR arithmetic operation on the zero-crossing signal ZCUNT from the BEMF detection unit BFDET' and the BEMF polarity signal DIR from the output control unit OTCT'. For example, in a case of using the comparator CPMzc such as that illustrated in FIG. 14, the zero-crossing signal ZCOUT rises at the zero-crossing timing in a case where the transition of BEMF is made in the positive direction (a case of performing zero-crossing from a negative electrode to a positive electrode) and falls at the zero-crossing timing in a case where it is made in the negative direction (a case of performing zero-crossing from the positive electrode to the negative electrode). On the other hand, the zero-crossing EOR signal ZCEOR is at the "H" level, for example, until reaching the zero-crossing timing and falls to an "L" level at the zero-crossing timing regardless of the transition direction of BEMF.

The error counter ECUNT operates in the assertion term (the mask term) of the mask signal MSK and performs a counting-up operation or a counting-down operation in accordance with a logical level of the zero-crossing EOR signal ZCEOR by using the error counter clock ERRCLK from the clock generation unit CGEN. For example, the error counter ECUNT performs the counting-up operation while the logical level of the zero-crossing EOR signal ZCEOR is the "H" level and performs the counting-down operation while it is the "L" level. As a result, the phase error PERR which is obtained as a final count value of the error counter ECUNT has a negative value when the zero-crossing timing of BEMF is more advanced than the center timing of the mask term and has a positive value when delayed.

The PI compensator PICp generates the rotation period count value NCNT for bringing the phase error PERR close to zero by performing PI control by using the phase error PERR as an input. The rotation period count value NCNT becomes a value which is proportional to the period of the phase switch timing signal COMM. In the PI compensator PICp, a value obtained by multiplying a value that the phase error PERR is delayed by one sampling by the control gain Kp1 becomes a proportional (P) gain and the control gain Kp2 becomes an integral (I) gain.

Further, the PI compensator PICp is configured to feed back a signal obtained by delaying the rotation period count value NCNT by one sampling and to reflect it on the integral gain. Thereby, since the control band changes in proportion to the rotational speed, it becomes possible to obtain a wide lock range, optimum responsiveness, stability in the PI compensator PICp. That is, if a fixed control band is determined in conformity to a case where the rotational speed is low, the responsiveness in a case where the rotational speed is high will be lowered. On the contrary, if the fixed control band is determined in conformity to a case where the rotational speed is high, the stability in a case where the rotational speed is low will be lowered. It is possible to solve such an issue by using the PI compensator PICp concerned.

The clock generation unit CGEN generates the phase switch timing signal COMM on the basis of the rotation period count value NCNT by using a counter and so forth. Specifically, the phase switch timing signal COMM is controlled in such a manner that the period is elongated (the frequency is lowered) as the rotation period count value NCNT becomes large. In addition, the clock generation unit CGEN generates the error counter clock ERRCLK and supplies it to the error counter ECUNT. The error counter clock ERRCLK is a clock which is adjusted in such a manner that an output from the error counter ECUNT typically has a constant detection gain relative to the rotational speed of the three-phase motor SPM. Specifically, the error counter clock ERRCLK is controlled in such a manner that the period is elongated (the frequency is lowered) as the rotational speed is lowered (as the rotation period count value NCNT becomes large).

Operation and Issues of Motor Drive Device
(Comparative Example)

Figure 15:
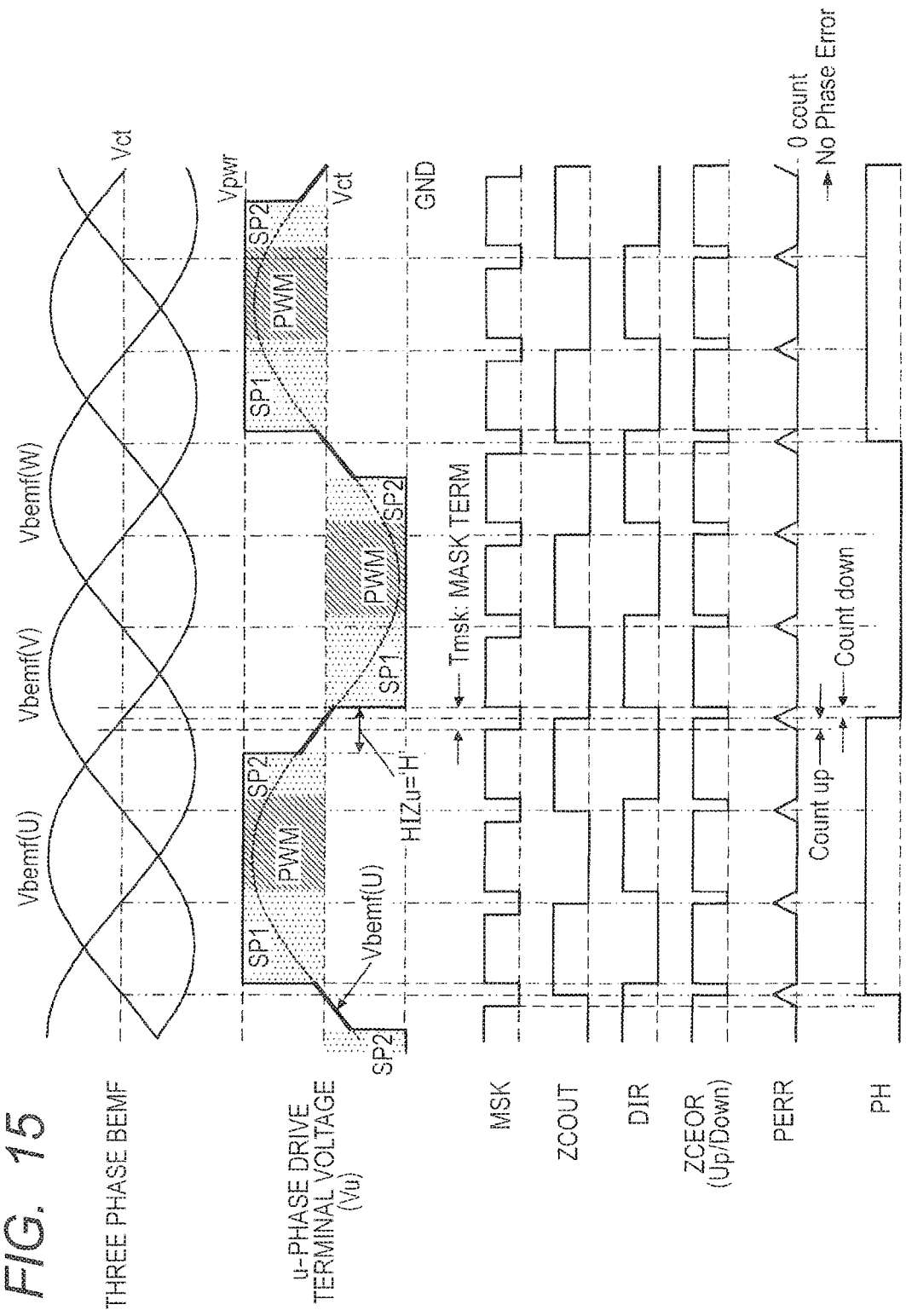
FIG. 15 is a timing chart illustrating one schematic operation example of main parts of the motor drive device in FIG. 10.

FIG. 15 is a timing chart illustrating one schematic operation example of main parts in the motor drive device in FIG. 10. Here, the operation example in a term that the three-phase motor SPM performs steady rotation is illustrated. Detection of BEMF is performed in a mask term Tmsk that the mask signal MSK is asserted to the "L" level. In the mask term Tmsk concerned, the drive terminal of the BEMF detection object phase (for example, the u phase) is controlled to a high-impedance state by using the high-impedance signal (HIZu). The mask term Tmsk is determined to, for example, a term of the electrical angle of about 15 deg including the zero-crossing timing in the electrical angle of 360 deg of BEMF.

The PLL control loop LPPLL' controls the electric-conduction timing (eventually, the phase of the mask term Tmsk) in such a manner that the assertion timing (the zero-crossing timing (here, a rising timing)) of the zero-crossing signal ZCOUT is maintained at the center timing of the mask term Tmsk. The BEMF polarity signal DIR is controlled to the "L" level in a term that BEMF undergoes zero-crossing from the positive electrode to the negative electrode and is controlled to the "H" level in a term for zero-crossing from the negative electrode to the positive electrode. In association therewith, the zero-crossing EOR signal ZCEOR is at the "H" level until reaching the zero-crossing timing and becomes the "L" level after the zero-crossing timing in the mask term Tmsk regardless of a polarity direction of BEMF.

The error counter ECUNT performs the counting-up operation in a term that the zero-crossing EOR signal ZCEOR is at the "H" level and performs the counting-down operation in a term that it is at the "L" level. Then, the count value at the end of the mask term Tmsk becomes the final phase error PERR. Since, in this example, the final phase error PERR is zero, electric conduction which is synchronous with BEMF is made.

On the other hand, if the zero-crossing timing comes earlier than the center timing of the mask term Tmsk, it will be a state where the phase of BEMF is advanced and the final phase error PERR will have a negative value. Then, the rotation period count value NCNT from the PI compensator PICp becomes small and thereby it is controlled in such a manner that the period of the phase switch timing signal COMM is shortened (in other words, the phase is advanced) and the negative phase error PERR becomes small in the next phase error detection. On the contrary, if the zero-crossing timing comes later than the center timing, the final phase error PERR will have a positive value. Then, the rotation period count value NCNT from the PI compensator PICp becomes large and thereby it is controlled in such a manner that the period of the phase switch timing signal COMM is elongated (in other words, the phase is delayed) and the positive phase error PERR becomes small in the next phase error detection. The motor phase signal PH is generated on the basis of the phase switch timing signal COMM which is controlled in this way and thereby becomes a signal which matches the frequency and the phase of BEMF.

Incidentally, in FIG. 15, the u-phase drive terminal (the drive terminal voltage Vu) is taken by way of example and a schematic driving method thereof is also illustrated in conjunction therewith. The u-phase drive terminals (OUTu, INu) are voltage-driven with the PWM signal which is based on the duty indicated value SOFTP from the soft pattern (SP1, SP2) generation part SPG in FIG. 12 in a term that a change in u-phase back electromotive voltage Vbemf(U) is large. On the other hand, the u-phase drive terminals are voltage-driven with the PWM signal which is based on the duty indicated value PWMP from the PWM pattern generation part PPG in FIG. 12 in a term that the change in u-phase back electromotive voltage Vbemf(U) is small.

Accordingly, in this example, the mask term Tmsk is inserted in the midst of driving the u-phase drive terminal using the soft pattern and it becomes possible to observe the u-phase back electromotive voltage Vbemf(U) at the u-phase drive terminal which is in the high-impedance state in the mask term Tmsk concerned. Incidentally, in regard to a method of driving the u-phase driver terminal, describing in more detail, in addition to provision of a drive term using the soft pattern or the PWM pattern as illustrated in FIG. 15, also a fixing term using the power supply voltage Vpwr or the ground power supply voltage GND is provided as described in FIG. 12, though omitted in FIG. 15.

Figure 16:
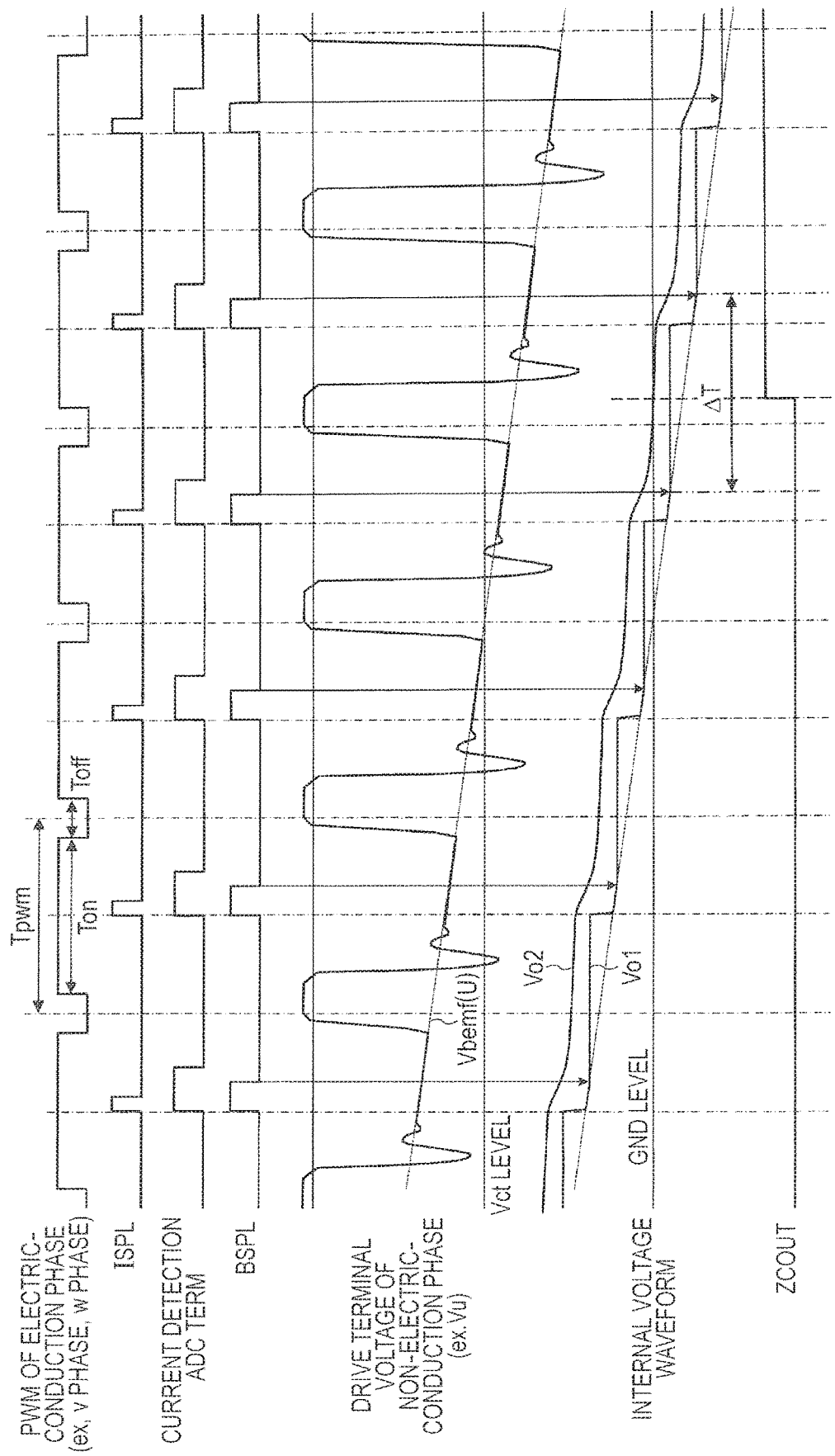
FIG. 16 is a timing chart illustrating one detailed operation example in the mask term in FIG. 15.

FIG. 16 is a timing chart illustrating one detailed operation example in the mask term in FIG. 15. As illustrated in FIG. 16, the drive terminal voltage Vu of the non-electric-conduction phase (here, the u phase) which becomes the detection object phase changes in synchronization with the PWM signals of the remaining two electric-conduction phases (the v phase, the w phase). In a term (called a PWM on-term Ton) that the PWM signal is at the "H" level (the on-level), one of the drive terminal voltages Vv, Vw of the two electric-conduction phases (the v phase, w phase) reaches the power supply voltage Vpwr in association with turning-on of the high-side transistor and the other reaches the ground power supply voltage GND in association with turning-on of the low-side transistor. Thereby, the center tap voltage Vct becomes "Vpwr/2" and the drive terminal voltage Vu of the non-electric-conduction phase reaches a voltage that the back electromotive voltage Vbemf(U) is superimposed on the center tap voltage Vct concerned.

On the other hand, in a term (called a PWM off-term Toff) that the PWM signal is at the "L" level (an off-level), a refluxing operation is performed on the high side or the low side of the two electric-conduction phases (the v phase, the w phase). In FIG. 16, a case where the refluxing operation is performed on the high side is illustrated. In association with the refluxing operation, both of the drive terminal voltages Vv, Vw of the two electric-conduction phases reach the vicinity of the power supply voltage Vpwr in association with turn-on of the high-side transistors or both reach the vicinity of the ground power supply voltage GND in association with turning-on of the low-side transistors.

As a result, the center tap voltage Vct reaches the vicinity of the power supply voltage Vpwr or the vicinity of the ground power supply voltage GND and describing in more detail has a value including a variation under the influence of a reflux diode and so forth. Since the drive terminal voltage Vu of the non-electric-conduction phase reaches the voltage that the back electromotive voltage Vbemf(U) is superimposed on the center tap voltage Vct like this, it would include the variation. In addition, in a case of becoming higher than the power supply voltage Vpwr and in a case of becoming lower than the ground power supply voltage GND in association with superimposition of the back electromotive voltage Vbemf(U), the drive terminal voltage Vu is clamped to the power supply voltage Vpwr and the ground power supply voltage GND via the reflux diodes of the u-phase transistors (M1$u$, M2$u$).

Further, in general, the duties of the PWM signals of the two electric-conduction phases become large at the zero-crossing timing of BEMF of the non-electric-conduction phase and a PWM off-term Toff becomes short accordingly. For this reason, it is not easy to detect the back electromotive voltage Vbemf(U) from the drive terminal voltage Vu concerned in the PWM off-term Toff. Thus, detection of the zero-crossing timing of BEMF is performed in the PWM on-term Ton in each PWM period Tpwm per PWM period Tpwm.

However, ringing occurs in the drive terminal voltage Vu directly after transition to the PWM on-term Ton due to the inductance component of the three-phase motor SPM, parasitic capacities of the high-side transistor and the low-side transistor and so forth. Therefore, the BEMF sampling signal BSPL used for BEMF detection is set to a timing at which this ringing would be avoided and is set to a timing which comes after the center of a PWM period Tpwm in this example. In addition, also the current sampling signal ISPL used for current control and an operation term of the analog-to-digital converter ADC in association therewith are set starting from the center timing of the PWM period Tpwm. Thereby, it becomes possible to sample an average value of the drive currents in the PWM period Tpwm.

The sample and hold circuit SH in FIG. 14 samples the drive terminal voltage Vu of the non-electric-conduction phase when the center tap voltage Vct is set as the reference in accordance with the assertion level (the "H" level) of the BEMF sampling signal BSPL. As a result, the input voltage (Vo1) into the low-pass filter LPF transitions similarly to the back electromotive voltage Vbemf(U) in the "H"-level term of the BEMF sampling signal BSPL and reaches a constant level in association with holding in the "L" level term and therefore exhibits a stepped waveform. The low-pass filter LPF generates the output voltage Vo2 by smoothing the input voltage (Vo1) which exhibits the stepped waveform. The comparator CMPzc asserts the zero-crossing signal ZCOUT when detecting the zero-crossing of the output voltage Vo2 concerned.

However, in such a system, while the BEMF sampling signal BSPL is synchronous with the PWM period Tpwm, BEMF is asynchronous with the PWM period Tpwm. Therefore, a variation may occur in the assertion timing of the zero-crossing signal ZCOUT depending on the sampling timing with the BEMF sampling signal BSPL. Specifically, it is feared that a variation time ΔT which is equivalent to the PWM period Tpwm in maximum may be generated in the zero-crossing timing in association with such a sampling error. In this case, it becomes difficult to detect the position of the three-phase motor SPM with high accuracy. As a result, a variation also occurs in electric-conduction timing and an increase in rotation jitter may occur.

Incidentally, as a method of detecting the position of the three-phase motor SPM with high accuracy (eventually, a method of reducing the rotation jitter), a method of shortening the PWM period Tpwm (increasing the PWM frequency) is conceivable. However, in this case, since the necessity to accelerate a switching speed of the three-phase driver SPMDV occurs, the degrees of difficulty in transistor design and control logic design are increased and also an increase in power consumption in association with a switching loss is feared. Further, a reduction in PWM resolution and so forth are also feared. Thus, it becomes beneficial to use a system of an embodiment which will be described in the following.

《Schematic Configuration of Motor Drive Device (First Embodiment)》

Figure 2:
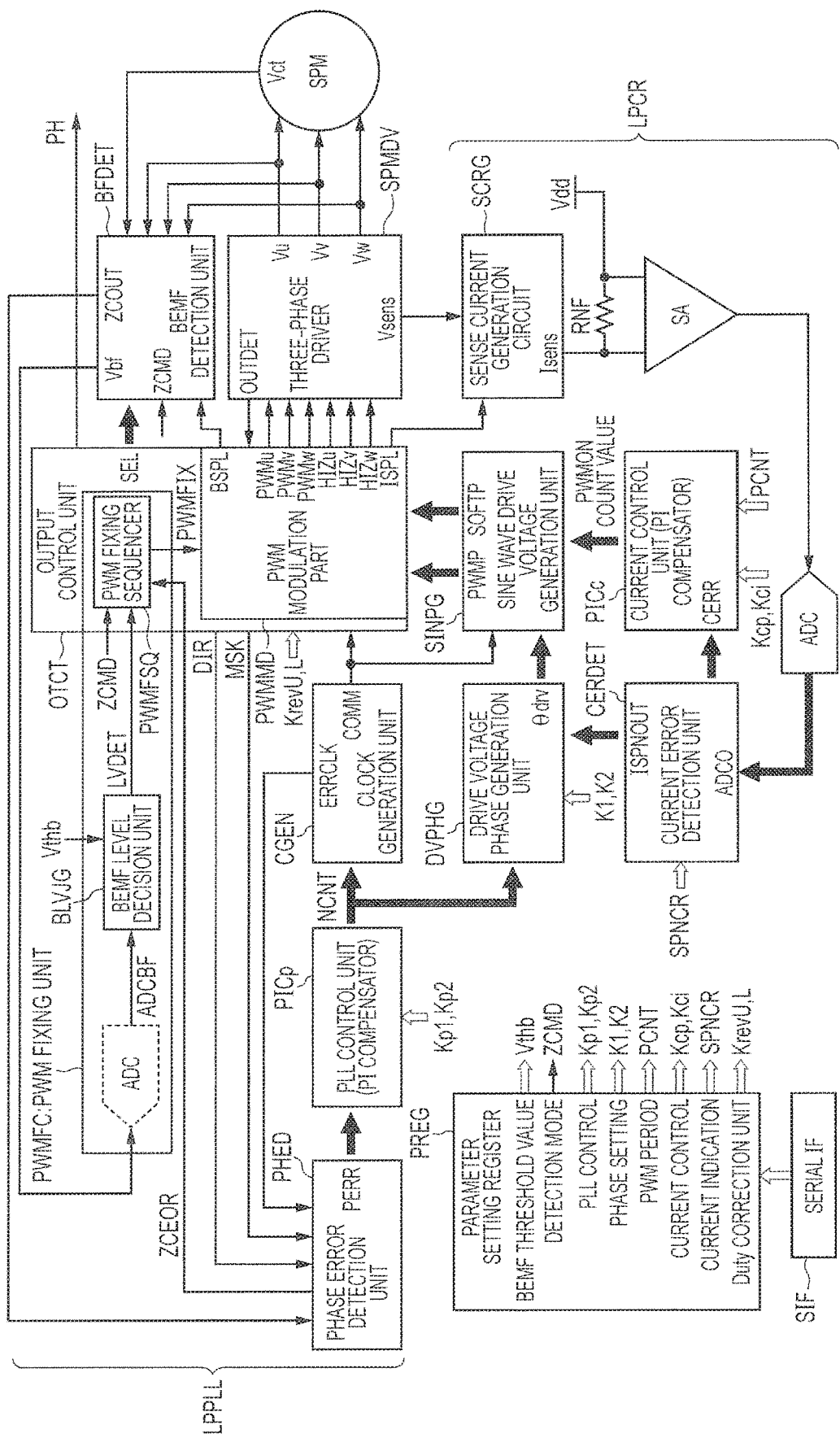
FIG. 2 is a block diagram illustrating one schematic configuration example of a motor drive device according to the first embodiment of the present invention.

FIG. 2 is a block diagram illustrating one schematic configuration example of the motor drive device according to the first embodiment of the present invention. In the motor drive device illustrated in FIG. 2, a PWM fixing unit PWMFC is additionally arranged in the PLL control loop LPPLL and the configurations of the BEMF detection unit BFDET and the output control unit OTCT are made slightly different when compared with the configuration example illustrated in FIG. 10. Further, in association with this difference, the parameter setting register PREG holds a BEMF threshold amplitude Vthb which is set from the outside of the device and selection information for a zero-crossing mode signal ZCMD. Incidentally, here, for the convenience of description, part of the PWM fixing unit PWMFC is provided in the output control unit OTCT.

The PWM fixing unit PWMFC is equipped with the analog-to-digital converter ADC, a BEMF level decision part BLVJG and a PWM fixing sequencer PWMFSQ. Roughly describing, the PWM fixing unit PWMFC monitors a back electromotive voltage Vbf from the BEMF detection unit BFDET and the zero-crossing signal ZCOUT (in this example, the zero-crossing EOR signal ZCEOR which is equivalent thereto). Then, the PWM fixing unit PWMFC controls a PWM fixing signal PWMFIX to an assertion level in a term (called an on-fixation term) from a predetermined timing after the amplitude level of the back electromotive voltage Vbf becomes smaller than the BEMF threshold amplitude Vthb to assertion of the zero-crossing signal ZCOUT (the zero-crossing EOR signal ZCEOR). Thereby, the PWM fixing unit PWMFC fixes the high-side transistor of one phase and the low-side transistor of the other phase in the two electric-conduction phases to the on states via a PWM modulation part PWMMD in the on-fixation term concerned regardless of the PWM period.

The BEMF detection unit BFDET is different in the point that the back electromotive voltage Vbf is output and the zero-crossing mode signal ZCMD is input when compared with the configuration example in FIG. 10. The zero-crossing mode signal SCMD is a signal used for selecting whether the zero-crossing detection system according to the aforementioned comparative example is used or the zero-crossing detection system according to the embodiment is used. Since the amplitude of BEMF is changed depending on the rotational speed of the three-phase motor SPM, a change which depends on the rotational speed becomes necessary also for the BEMF threshold amplitude Vthb. In this example, the zero-crossing detection system according to the comparative example is used, for example, at start-up of the three-phase motor SPM in order to make such a change unnecessary. Then, when reaching steady rotation in which the rotation jitter becomes an issue, the zero-crossing system according to the embodiment is used by switching the zero-crossing mode signal ZCMD via the serial interface SIF.

The output control unit OTCT is different in configuration and operation of the PWM modulation part PWMMD when compared with the configuration example in FIG. 10. As rough different points, the PWM modulation part PWMMD actually executes control to fix a predetermined transistor to the on state in accordance with the aforementioned PWM fixing signal PWMFIX via the PWM signal PWM (u, v, w) and changes a method of generating the BEMF sampling signal BSPL in accordance with the PWM fixing signal PWMFIX.

«Details Around PLL Control Loop (First Embodiment)»

Figure 3:
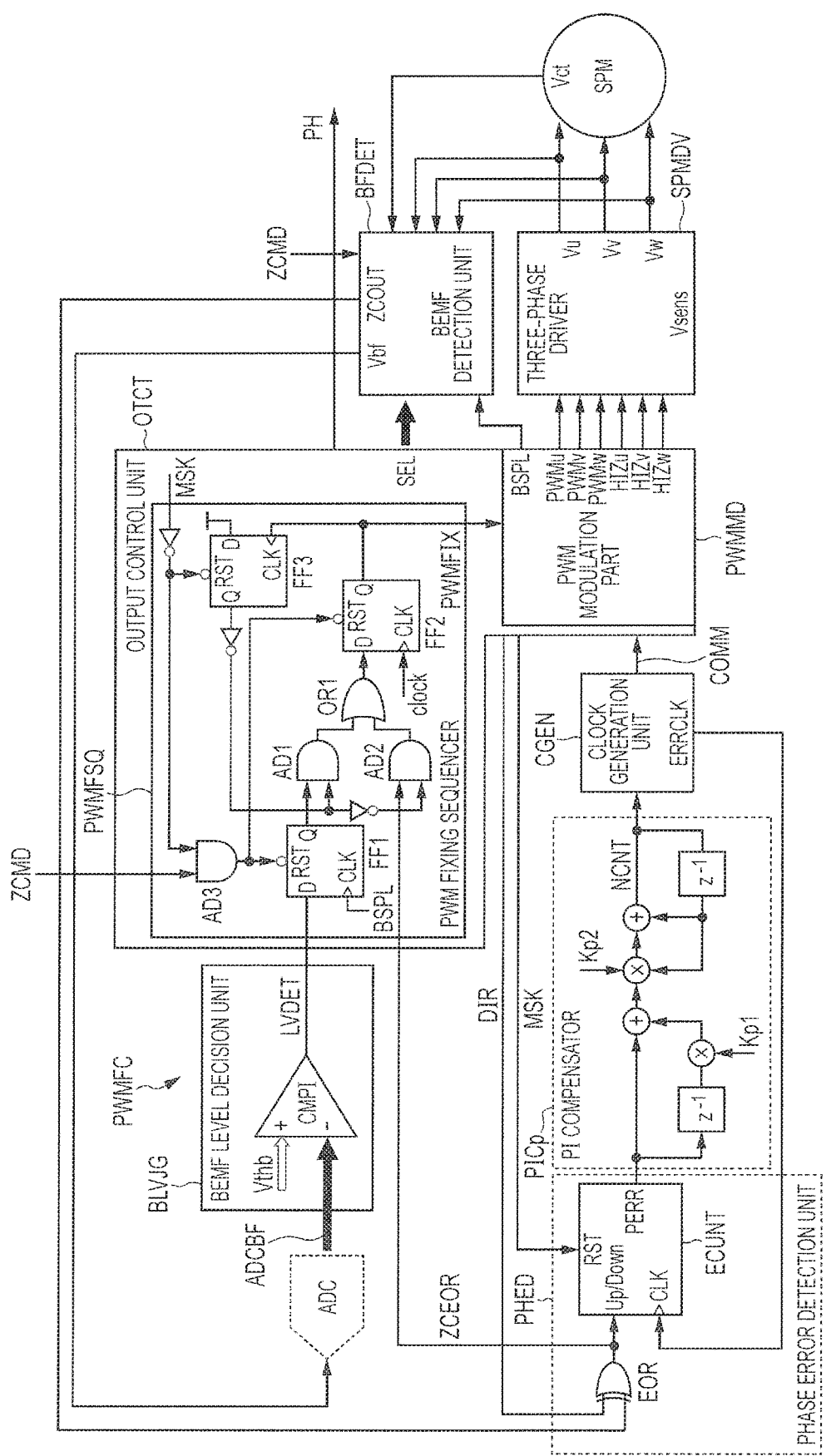
FIG. 3 is a block diagram illustrating one detailed configuration example around a PLL control loop in FIG. 2.
Figure 4:
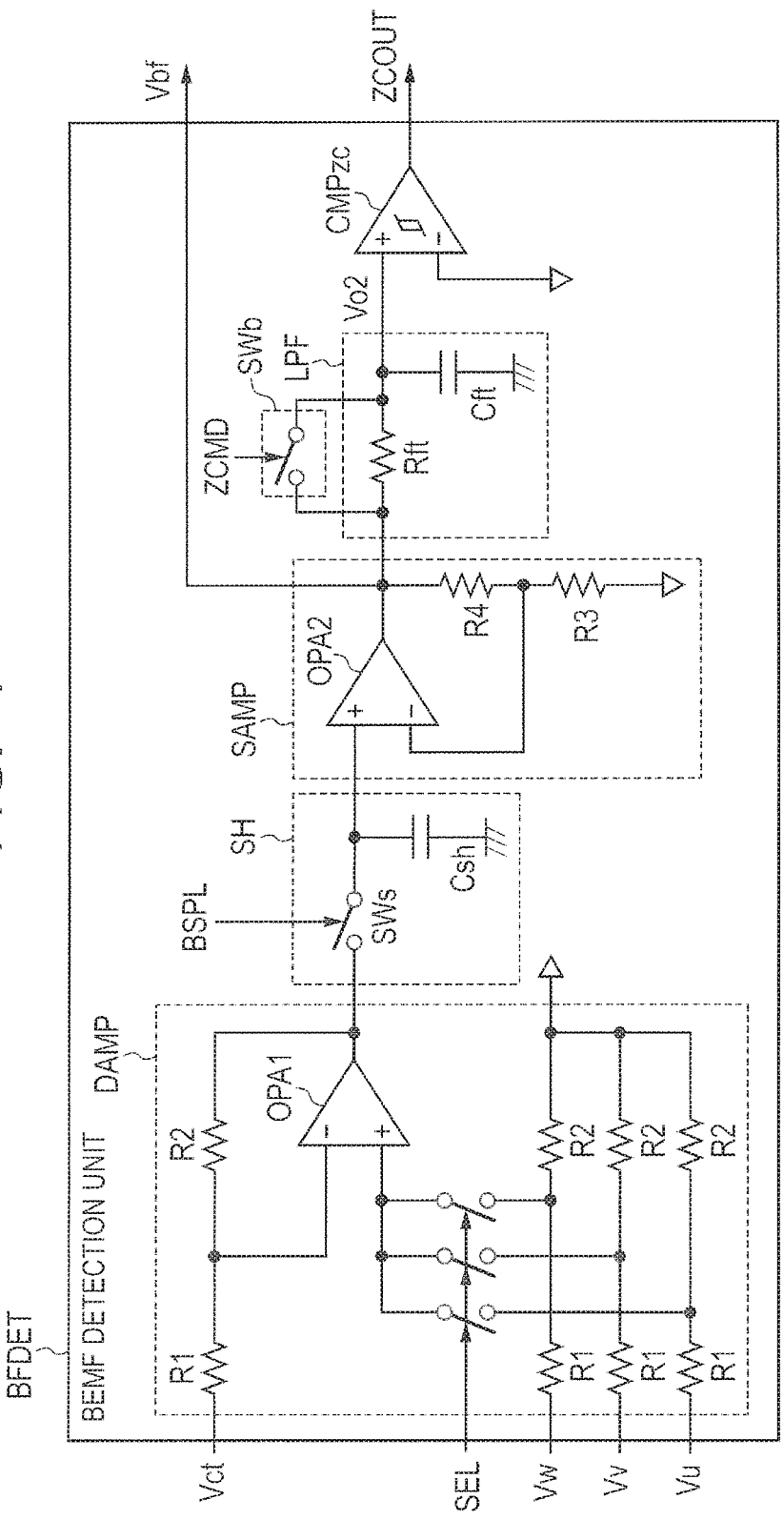
FIG. 4 is a circuit diagram illustrating one detailed configuration example of a BEMF detection unit in FIG. 3.

FIG. 3 is a block diagram illustrating one detailed configuration example around the PLL control loop in FIG. 2. FIG. 4 is a circuit diagram illustrating one detailed configuration example of the BEMF detection unit in FIG. 3. The BEMF detection unit BFDET illustrated in FIG. 4 is different in the point that a held voltage (in this example, an output voltage from the amplification circuit SAMP which is proportional thereto) in the sample and hold circuit SH is output as the back electromotive voltage Vbf and the point that a bypass switch SWb is arranged when compared with the configuration example in FIG. 14.

The bypass switch SWb is coupled in parallel with the resistance element Rft of the low-pass filter LPF, and when controlled to the on-state in accordance with the zero-crossing mode signal ZCMD, bypasses the low-pass filter LPF and when controlled to the off state, does not bypass the low-pass filter LPF. That is, in a case of using the zero-crossing detection system according to the embodiment, the bypass switch SWb bypasses the low-pass filter LPF. Thereby, a delay time which is incidental to filtering is eliminated and it becomes possible to detect the zero-crossing timing with high accuracy.

In addition, although details will be described later, the BEMF sampling signal BSPL which is generated by the PWM modulation part PWMMD is continuously asserted in the on-fixation term which is based on the aforementioned PWM fixing signal PWMFIX in the mask term Tmsk, unlike the case in FIG. 14. On the other hand, the BEMF sampling signal BSPL is asserted in the PWN on-term Ton per PWM period Tpwm similarly to the case in FIG. 14 in terms except the on-fixation term in the mask period Tmsk.

In FIG. 3, the PWM fixing unit PWMFC which is configured by the analog-to-digital converter ADC, the BEMF level decision part BLVJG and the PWM fixing sequencer PWMFSQ is added to the configuration example in FIG. 13 and the configuration example which is more detail than that of the PWM fixing unit illustrated in FIG. 2 is illustrated. The analog-to-digital converter ADC converts the back electromotive voltage Vbf (describing in detail, an absolute value of the amplitude thereof) from the BEMF detection unit BFDET into a digital value ADCBF.

The BEMF level decision part BLVJG is equipped with a comparator CMP1. The comparator CMP1 is a digital comparator and compares the digital value ADCBF from the analog-to-digital converter ADC with a digital value which corresponds to the BEMF threshold amplitude Vthb and outputs a level detection signal LVDET which is a result of comparison. Here, when the digital value ADCBF (the absolute value of the amplitude of the back electromotive voltage Vbf) becomes smaller than the BEMF threshold amplitude Vthb, the comparator CMP1 outputs the "H"-level level detection signal LVDET.

The PWM fixing sequencer PWMFSQ receives the level detection signal LVDET from the comparator CMP1 and the zero-crossing signal ZCOUT (describing in detail, the zero-crossing EOR signal ZCEOR) and generates the PWM fixing signal PWMFIX which reaches the assertion level (here, the "H" level) in the on-fixation term. Specifically, the PWM fixing sequencer PWMFSQ is equipped with AND gates AD1 to AD3, an OR gate OR1 and flip-flops FF1 to FF3.

When the zero-crossing mode signal ZCMD is at the "L" level or in a term that the zero-crossing mode signal ZCMD is at the "H" level and the mask signal MSK is at the "H" level, the flip-flops FF1 to FF3 enter reset states. In this reset state, the PWM fixing signal PWMFIX is fixed to a negate level (the "L" level) and the PWM fixing unit PWMFC substantially enters an invalid state. On the other hand, in a term that the zero-crossing mode signal ZCMD is at the "H" level and the mask signal MSK is at the "L" level, the reset states of the flip-flops FF1 to FF3 are released. In this state, the PWM fixing unit PWMFC enters a valid state.

In the valid state of the PWM fixing unit PWMFC, when the level detection signal LVDET reaches the "H" level, the flip-flop FF1 latches the "H" level concerned at a rising edge of the next BEMF sampling signal BSPL. The AND gate AD1 outputs the "H" level in accordance with an "H"-level input from the flip-flop FF1 and an "H"-level input from the flip-flop FF3. As a result, the PWM fixing signal PWMFIX transitions to the "H" level via the OR gate OR1 and the flip-flop FF2. On the other hand, the AND gate AD2 outputs the "L" level in association with an "L"-level input from the flip-flop FF3.

When the PWM fixing signal PWMFIX transitions to the "H" level, the flip-flop FF3 latches the "H" level. The AND gate AD1 outputs the "L" level in accordance with an "L"-level input from the flip-flop FF3. On the other hand, the AND gate AD2 outputs the "H" level in place of the AND gate AD1 in accordance with the "H"-level input from the flip-flop FF3 and an "H"-level input according to the zero-crossing EOR signal ZCEOR. As a result, the PWM fixing signal PWMFIX maintains the "H" level via the OR gate OR1 and the flip-flop FF2.

Then, when the zero-crossing EOR signal ZCEOR transitions to the "L" level, the AND gate AD2 outputs the "L" level. As a result, the PWM fixing signal PWMFIX transitions to the "L" level via the OR gate OR1 and the flip-flop FF2. Owing to such operations, the PWM fixing signal PWMFIX is controlled to the "H" level in a term (the on-fixation term) from the rising edge of the BEMF sampling signal BSPL after the amplitude level of the back electromotive voltage Vbf becomes smaller than the BEMF threshold amplitude Vthb to assertion of the zero-crossing EOR signal ZCEOR.

«Operation of Motor Drive Device (First Embodiment)»

Figure 5:
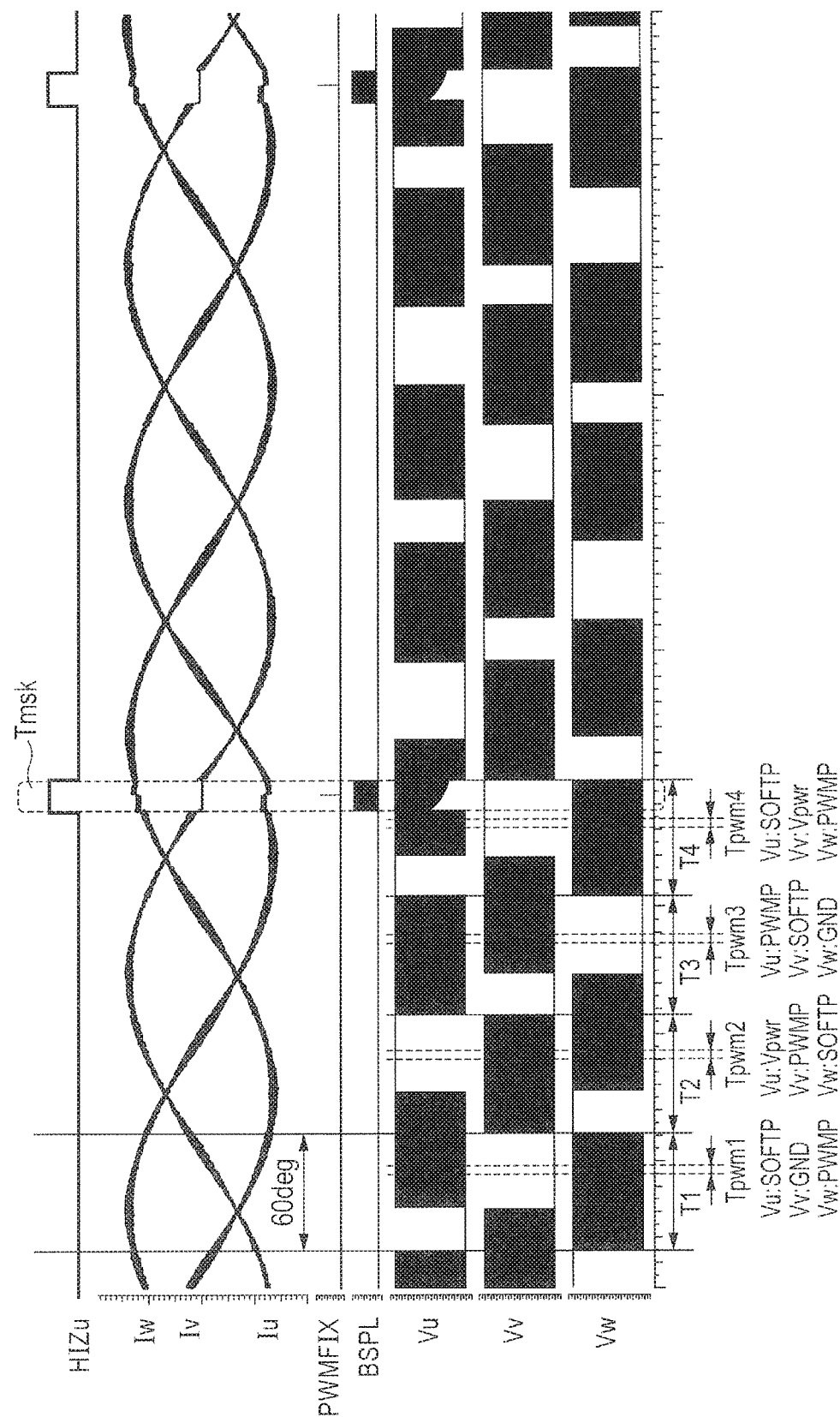
FIG. 5 is a waveform diagram illustrating one schematic operation example of main parts of the motor drive device in FIG. 2.

FIG. 5 is a waveform diagram illustrating one schematic operation example of main parts of the motor drive device in FIG. 2. As described in FIG. 12, the motor drive device in FIG. 2 performs PWM-control on one of the remaining two phases on the basis of the duty indicated value PWMP (describing in detail, PWMR) and performs PWM-control on the other on the basis of the duty indicated value SOFTP (describing in detail, SOFTR) in a state where the drive terminal voltage Vu, Vv, Vw of any one of the three phases is fixed to the power supply voltage Vpwr or the ground power supply voltage GND. Then, the motor drive device controls drive currents Iu, Iv, Iw for the three phases to sine-wave forms while alternately switching between fixation to the power supply voltage Vpwr and fixation to the ground power supply voltage GND per electrical angle of 60 deg.

For example, in a term T1 of the electrical angle of 60 deg in FIG. 5, the u-phase drive terminal voltage Vu is fixed to the ground power supply voltage GND in a first-half section and the v-phase drive terminal voltage Vv is fixed to the ground power supply voltage GND in a second-half section. In addition, in a term T2 of the electrical angle of 60 deg which follows the term T1, the w-phase drive terminal voltage Vw is fixed to the power supply voltage Vpwr in the first-half section and the u-phase drive terminal voltage Vu is fixed to the power supply voltage Vpwr in the second-half section. Incidentally, as indicated in Japanese Unexamined Patent Application Publication No. 2017-85799, the phase which is fixed to the ground power supply voltage GND is a phase which has a minimum voltage in the sine-wave drive voltages of the three phases and, on the contrary, the phase which is fixed to the power supply voltage Vpwr is a phase which has a maximum voltage. It is possible to expand the relative voltage amplitudes among the three phases in the limited power supply voltage Vpwr by performing such level modulation.

In addition, for example, in a PWM period Tpwm1 which is the second-half section of the term T1, the u-phase drive terminal voltage Vu is subjected to PWM-control on the basis of the duty indicated value SOFTP (SOFTR) and the w-phase drive terminal voltage Vw is subjected to PWM-control on the basis of the duty indicated value PWMP (PWMR) in a state where the v-phase drive terminal voltage Vv is fixed to the ground power supply voltage GND. In the PWM period Tpwm1, a change of the u-phase drive terminal current Iu (eventually, BEMF of the u phase) is large and the duty indicated value SOFTP which is based on the soft pattern is applied in such a term as described also in FIG. 15. In addition, a change of the w-phase drive current Iw (eventually, BEMF of the w phase) is small and the duty indicated value PWMP which is based on the PWM pattern is applied in such a term as described also in FIG. 15.

Here, in a PWM period Tpwm4 which is the second-half section of the term T4, the u-phase drive terminal voltage Vu is subjected to PWM-control on the basis of the duty indicated value SOFTP (SOFTR) and the w-phase drive terminal voltage Vw is subjected to PWM-control on the basis of the duty indicated value PWMP (PWMR) in a state where the v-phase drive terminal voltage Vv is fixed to the power supply voltage Vpwr. The u-phase drive terminal is controlled to the high-impedance state in accordance with the u-phase high-impedance signal HIZu in the midst of a so-controlled state. Then, in the mask term Tmsk, the BEMF sampling signals BSPL are sequentially generated per PWM period and the "H"-level PWM fixing signal PWMFIX is generated near the center of the mask term Tmsk with the high-impedance-state u phase concerned being set as the BEMF detection object phase.

Incidentally, in this mask term Tmsk, the v-phase drive terminal voltage Vv is fixed to the power supply voltage Vpwr via the high-side transistor M1v which is fixed to the on-state. The w-phase drive terminal voltage Vw becomes a voltage which is obtained as a result of driving the low-side transistor M2w with the PWM signal PWMw which is based on the duty indicated value PWMP (PWMR). The u-phase drive terminal voltage Vu is in the high-impedance state and BEMF is observed in an on-level term of the w-phase PWM signal PWMw (the PWM on-term Ton in FIG. 16).

Figure 6:
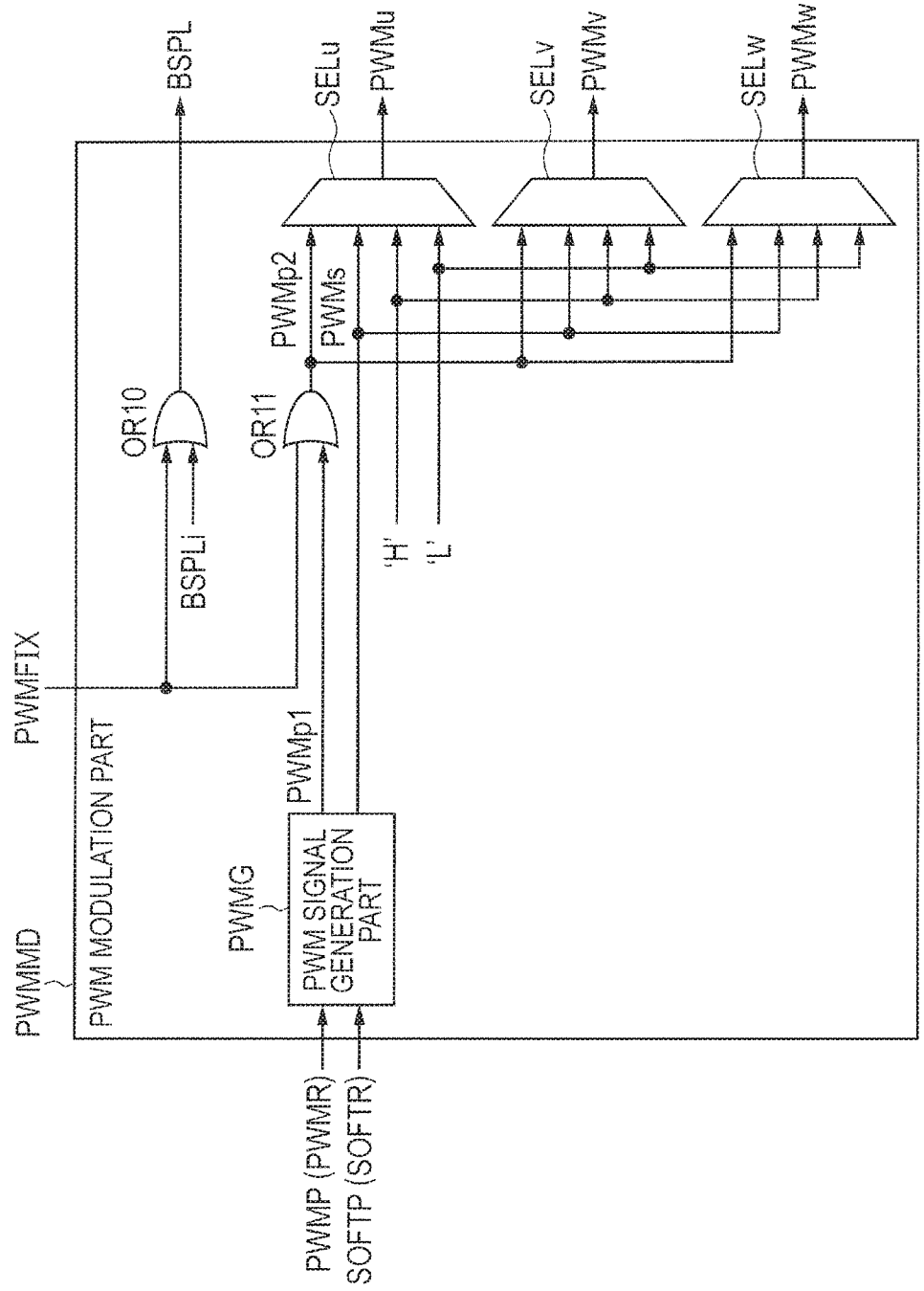
FIG. 6 is a schematic diagram illustrating one configuration example of main parts of a PWM modulation part in FIG. 2.

FIG. 6 is a schematic diagram illustrating one configuration example of the main parts of the PWM modulation part in FIG. 2. In FIG. 6, the PWM signal generation unit PWMG generates a PWM signal PWMp1 on the basis of the duty indicated value PWMP (PWMR) and generates a PWM signal PWMs on the basis of the duty indicated value SOFTP (SOFTR). An OR gate OR11 outputs a result of OR operation of the PWM signal PWMp1 and the PWM fixing signal PWMFIX as a PWM signal PWMp2. An OR gate OR10 outputs a result of OR operation of a BEMF sampling signal BSPLi per PWM period and the PWM fixing signal PWMFIX as the BEMF sampling signal BSPL.

A selector SELu selects any one signal in the PWM signals PWMp2, PWMs, the "H" level signal and the "L" level signal and outputs it as the PWM signal PWMu. Likewise, also in regard to the v phase and the w phase, selectors SELv, SELw output each one signal selected from within the four signals as the PWM signals PWMv, PWMw respectively.

For example, in the PWM period Tpwm4 in FIG. 5, the selector SELu selects the PWM signal PWMs, the selector SELv selects the "H" level signal and the selector SELw selects the PWM signal PWMp2. Then, in a case where the PWM fixing signal PWMFIX reaches the "H" level in the mask term Tmsk, the PWM signal PWMp2 is fixed to the "H" level and the selector SELw selects the PWM signal PWMp2 which is fixed to the "H" level concerned. In accordance therewith, the w-phase low-side transistor M2w is fixed to the on-state. In addition, in a "H" level term (the on-fixation term) of the PWM fixing signal PWMFIX, also the BEMF sampling signal BSPL is fixed to the "H" level.

Figure 7:
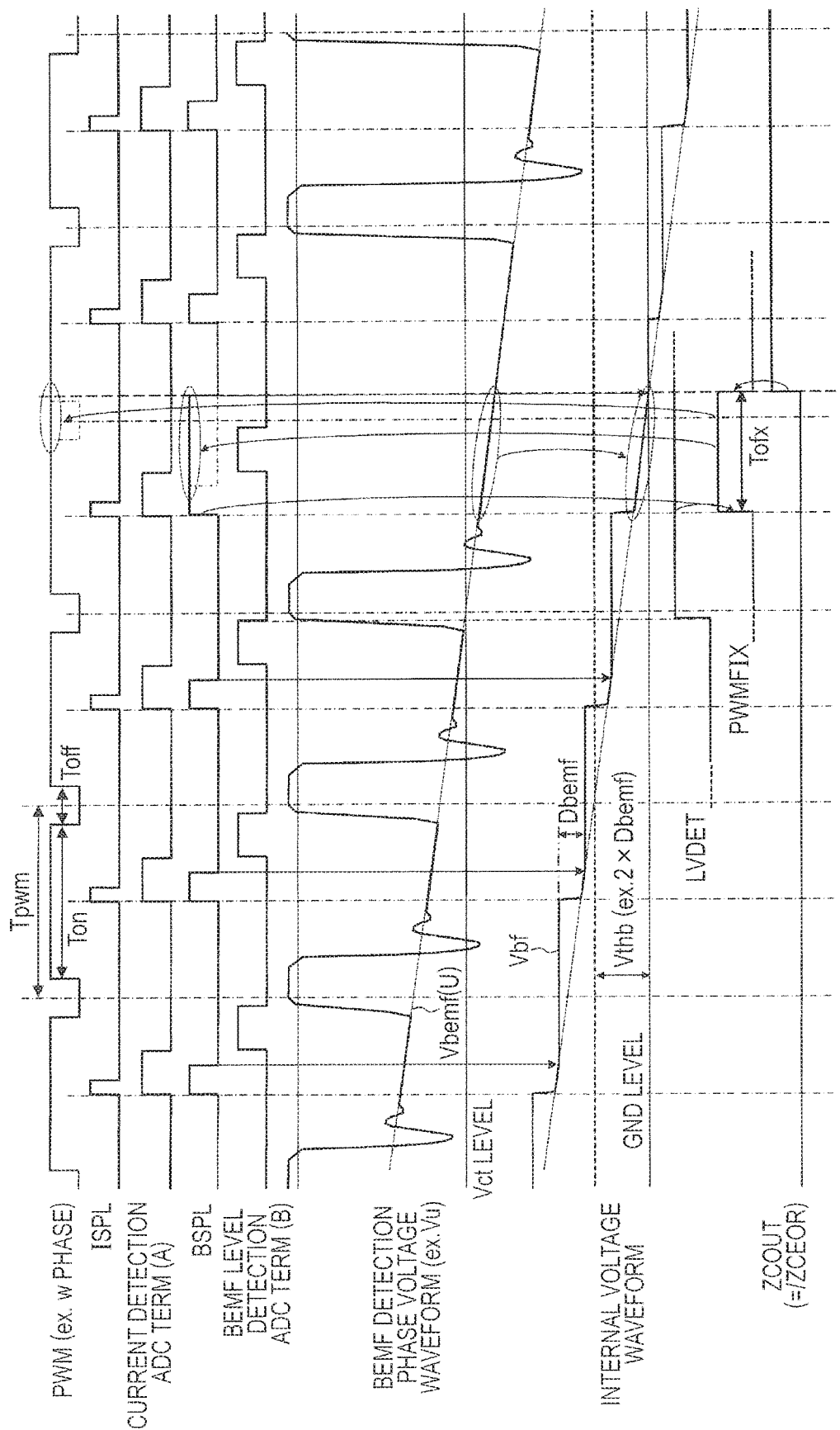
FIG. 7 is a timing chart illustrating one detailed operation example in a mask term in FIG. 5.

FIG. 7 is a timing chart illustrating one detailed operational example in the mask term in FIG. 5. Here, description will be made focusing on points which are different from those in the timing chart illustrated in FIG. 16. In FIG. 7, a conversion term (B) by the analog-to-digital converter ADC for BEMF level detection in the PWM fixing unit PWMFC is provided. In this example, the conversion term (B) concerned is provided contiguously to a conversion term (A) by the analog-to-digital converter ADC for current detection. However, it is not particularly necessary for the conversion term (B) to be contiguously provided and the conversion term (B) may be provided between the this-time conversion term (A) and the next-time conversion term (A). It becomes possible to commonize the analog-to-digital converter ADC for BEMF level detection with the analog-to-digital converter ADC for current detection by providing the two not-overlapping conversion terms in a term having the same length as the PWM period Tpwm in this way. As a result, reductions in circuit area and power consumption are promoted.

In addition, in FIG. 7, decision by the BEMF level decision part BLVJG is performed on the stepped back electromotive voltage Vbf which corresponds to the output voltage Vo1 in FIG. 16. In this case, the BEMF threshold amplitude Vthb used in the BEMF level decision part BLVJG is determined to the magnitude which is, for example, "3×Dbemf" or less and is desirably determined to "2×Dbemf" and so forth when a change amount of BEMF generated in one PWM period Tpwm is denoted by "Dbemf". The BEMF threshold amplitude Vthb concerned is obtained by, for example, simulation and so forth in advance and is set into the parameter setting register PREG from the outside of the device. In a case where the amplitude level of the back electromotive voltage Vbf becomes smaller than the BEMF threshold amplitude Vthb at a termination timing of the conversion term (B), the BEMF level decision part BLVJG outputs the "H"-level level detection signal LVDET.

When the level detection signal LVDET reaches the "H" level, the PWM fixing signal PWMFIX is controlled to the "H" level at the rising edge of the subsequent BEMF sampling signal BSPL. In a term (an on-fixation term Tofx) that the PWM fixing signal PWMFIX is at the "H" level, the PWM signal (for example, PWMw in the mask term Tmsk in FIG. 5) is fixed to the "H" level and also the BEMF sampling signal BSPL is fixed to the "H" level. As a result, in the on-fixation term Tofx concerned, the BEMF detection unit BFDET in FIG. 4 detects BEMF not per PWM period but continuously. In association therewith, also the back electromotive voltage Vbf is shaped into a not-stepped and continuous waveform.

Then, when the zero-crossing signal ZCOUT (the zero-crossing signal ZOCEOR) is asserted, the PWM fixing signal PWMFIX is controlled to the "L" level. In accordance therewith, also "H"-level fixation of the PWM signal (for example, PWMw) and the BEMF sampling signal BSPL is released and the operation is returned to the one which is the same as that of the case in FIG. 16. That is, in the terms except the on-fixation term Tofx in the mask term Tmsk, the PWM signal becomes a signal which is based on the predetermined duty indicated value (for example, PWMP (PWMR)) and the BEMF sampling signal BSPL becomes a signal which is asserted in the PWWM on-term Ton per PWM period Tpwm.

«Main Effects of First Embodiment»

When the system of the first embodiment is used, it becomes possible to detect BEMF not per PWM period (in other words, per BEMF sampling signal BSPL) but continuously in the term from directly before assertion of the zero-crossing signal ZCOUNT to assertion of the zero-crossing signal ZCOUNT as described above. Thereby, since the variation time ΔT which is incidental to the sampling error as in the case in FIG. 16 is not generated, it is possible to detect the zero-crossing timing with high accuracy and eventually it becomes possible to detect the position of the three-phase motor with high accuracy. In addition, in association therewith, a reduction in rotation jitter becomes possible and it is possible to promote, for example, capacity enlargement and so forth of the HDD apparatus.

Incidentally, when the PWM signal is fixed to an on-level in the on-fixation term Tofx as illustrated in FIG. 7, influence on the drive current waveform is feared. Thus, it is possible to shorten the on-fixation term Tofx by setting the BEMF threshold amplitude Vthb to the smallest possible value (for example, "3×Dbemf" or less, desirably "2×Dbemf" and so forth) and thereby it is possible to reduce the influence on the drive current waveform. For example, in a case of setting to "2×Dbemf", ideally, a length which is less than that of one PWM period Tpwm is enough for the on-fixation term Tofx. Further, as illustrated in FIG. 5, since the drive currents (Iv, Iw) (eventually, the duties) of the electric-conduction phases are originally large, the influence exerted in a case where the PWM signal is fixed to the on-level causes no particular issue also for this reason.

In addition, since in this example, a level modulation system of fixing one of the two electric-conduction phases to the power supply voltage Vpwr or the ground power supply voltage GND and subjecting the other to PWM-control is used, the PWM on-term Ton is determined only with the PWM signal of the other phase. However, the PWM on-term Ton is determined in accordance with the PWM signals of the two electric-conduction phases depending on the level modulation system used or presence/absence of level modulation and hence becomes a term that both of the high-side transistor of one phase and the low-side transistor of the other phase are turned on. Further, although the application example to a 180-deg electric-conduction system is indicated here, it is also possible to apply the PWM fixing signal PWMFIX to a 120-deg electric-conduction system in the same way, not limited to this.

Second Embodiment

«Details Around PLL Control Loop (Second Embodiment)»

Figure 8:
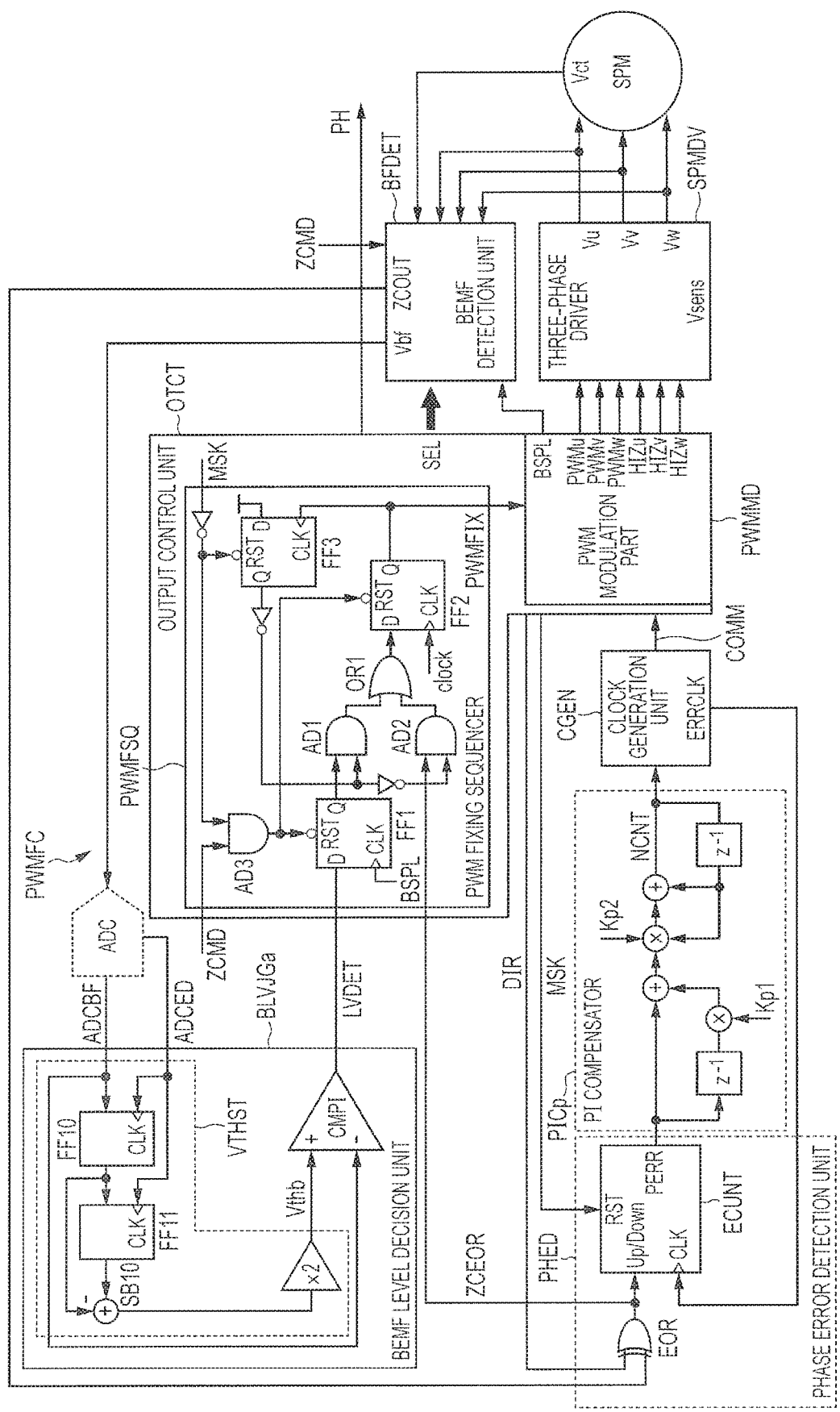
FIG. 8 is a block diagram illustrating one detailed configuration example around a PLL control loop in a motor drive device according to a second embodiment of the present invention.

FIG. 8 is a block diagram illustrating one detailed configuration example around the PLL control loop in a motor drive device according to the second embodiment of the present invention. The configuration example illustrated in FIG. 8 is different in configuration of a BEMF level decision part BLVJGa in the PWM fixing unit PWMFC when compared with the configuration example illustrated in FIG. 3. The BEMF threshold amplitude Vthb is set from the outside of the device in the configuration example in FIG. 3. On the other hand, in the configuration example in FIG. 8, the BEMF threshold amplitude Vthb is set in the device by using a threshold value setting part VTHST.

The threshold value setting part VTHST detects the change amount of the back electromotive voltages Vbf among the plurality of PWM periods Tpwm on the basis of the back electromotive voltage Vbf that the BEMF detection unit BFDET detects per PWM period Tpwm in the mask term Tmsk and determines the BEMF threshold amplitude Vthb on the basis of the detected change amount concerned. As a specific example, the threshold value setting part VTHST latches the digital values ADCBF for continuous two times from the analog-to-digital converter ADC by the flip-flops FF10, FF11 respectively. Then, the threshold value setting part VTHST calculates a differential value between the previously latched one and the this-time latched one by using a subtractor SB10 and sets a digital value obtained by doubling a result of calculation in the comparator CMP1 as the BEMF threshold amplitude Vthb.

In addition, the analog-to-digital converter ADC outputs an ADC completion signal ADCED every time conversion is completed and the flip-flops FF10, FF11 perform latching in synchronization with the ADC completion signal ADCED. In this case, the BEMF threshold amplitude Vthb is determined on the basis of the digital values ADCBF for two times directly before assertion of the level detection signal LVDET, for example, in FIG. 7. As a result, it becomes possible to determine the appropriate BEMF threshold amplitude Vthb.

Incidentally, the digital value ADCBF which becomes the basis of the BEMF threshold amplitude Vthb is not necessarily limited to this and it is also possible to appropriately change it by appropriately combining the ADC completion signal ADCED with a logic. As one example, the threshold amplitude Vthb may be determined on the basis of the digital value ADCBF near the center timing of the mask term Tmsk while leaving the PWM fixing unit PWMFC in the invalid state with the zero-crossing mode signal ZCMD in the mask term Tmask directly after reaching steady rotation. The BEMF threshold amplitude Vthb concerned is used later when the PWM fixing unit PWMFC enters the valid state.

«Main Effects of Second Embodiment»

It becomes further possible to reduce the influence of characteristic variations of the three-phase motor SPM by using the system of the second embodiment as above, in addition to the various effects described in the first embodiment. That is, for example, when the torque constant and so forth of the three-phase motor SPM vary, also the amplitude of BEMF is changed and therefore it is feared that use of the fixed BEMF threshold amplitude Vthb may become inappropriate. Specifically, a situation that the on-fixation term Tofx becomes excessively long and a situation that the zero-crossing timing comes before assertion of the PWM fixing signal PWMFIX conversely are feared. When the system of the second embodiment is used, it is possible to avoid such situations.

Third Embodiment

«Configuration and Operation of BEMF Detection Unit (Third Embodiment)»

Figure 9:
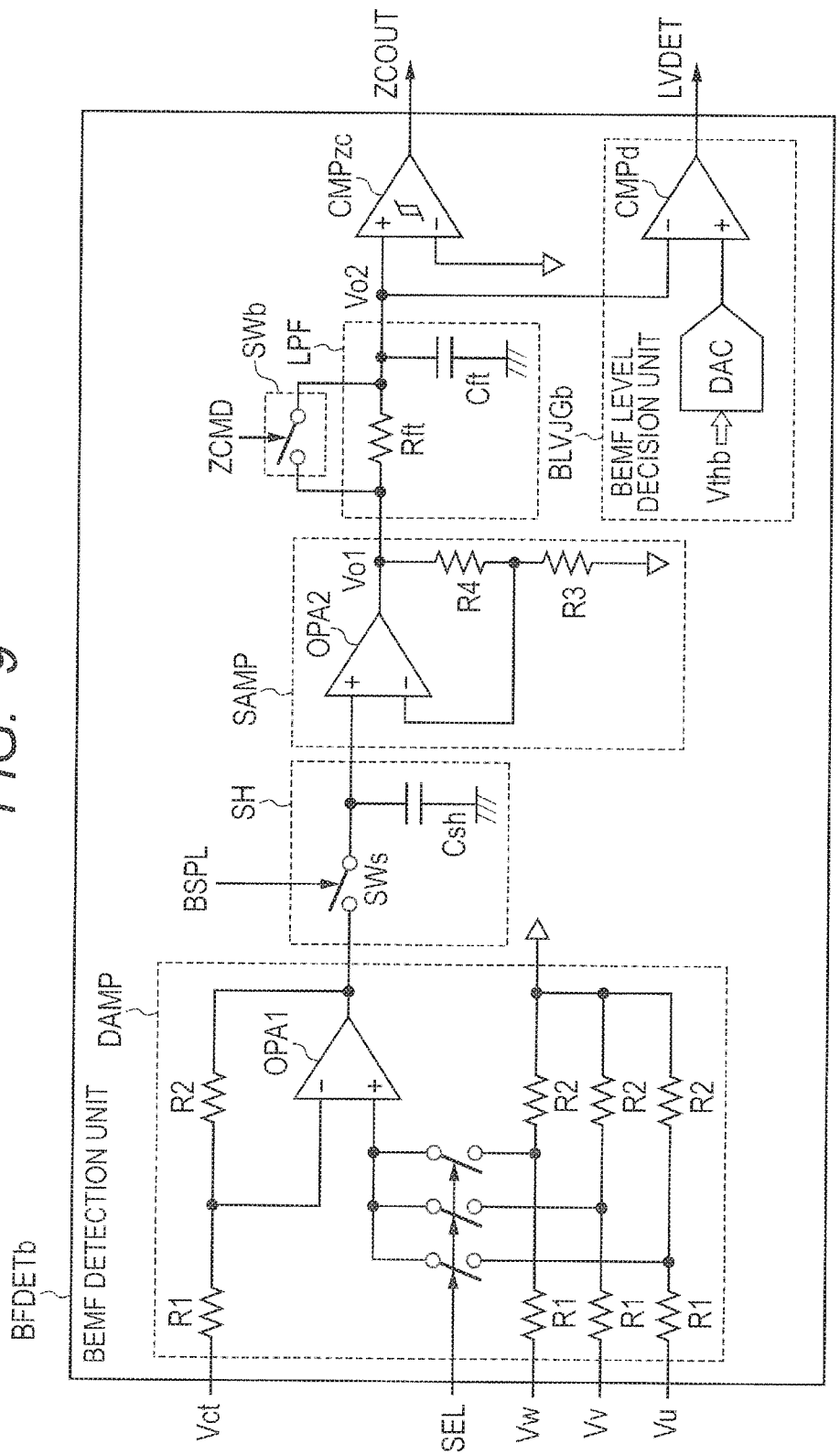
FIG. 9 is a circuit diagram illustrating one detailed configuration example of a BEMF detection unit in a motor drive device according to a third embodiment of the present invention.

FIG. 9 is a circuit diagram illustrating one detailed configuration example of a BEMF detection unit in a motor drive device according to the third embodiment of the present invention. A BEMF detection unit BFDETb illustrated in FIG. 9 is equipped with a BEMF level decision part BLVJGb which bear the same functions as the analog-to-digital converter ADC and the BEMF level decision part BLVJG illustrated in FIG. 9 unlike the configuration example in FIG. 4. The BEMF level decision part BLVJGb is equipped with the digital-to-analog converter DAC and a comparator CMPd. Here, a case where the zero-crossing of BEMF occurs from the positive electrode to the negative electrode is supposed as illustrated in FIG. 7.

The digital-to-analog converter DAC receives the BEMF threshold amplitude Vthb in the form of a digital value and converts it into an analog value. The digital-to-analog converter DAC may have a simple configuration of, for example, an R-2R resistor ladder system, a system of flowing currents which are exponents of 2 into a common resistor and so forth. The comparator CMPd is an analog comparator and compares BEMF which becomes the input voltage (Vo2) into the comparator CMPzc with the analog value from the digital-to-analog converter DAC and, in a case where BEMF becomes smaller than the analog value concerned, outputs the "H"-level level detection signal LVDET. After that, the operation which is the same as that in the case of the first embodiment is performed by using the PWM fixing sequencer PWMFSQ in FIG. 3. Incidentally, the output voltage Vo1 from the amplification circuit SAMP may be input into the comparator CMDd in place of the input voltage (Vo2) into the comparator CMPzc.

«Main Effects of Third Embodiment»

Since the analog-to-digital converter in the PWM fixing unit PWMFC become unnecessary by using the system of the third embodiment as above, in addition to the various effects described in the first embodiment, there are cases where the configuration is able to be simplified. In addition, application to a motor system which is not equipped with the analog-to-digital converter or use of the analog-to-digital converter which becomes unnecessary in another application and so forth becomes possible.

Although the invention made by the present inventors was specifically described on the basis of the embodiments as above, the present invention is not limited to the aforementioned embodiments and may be modified and altered in a variety of ways within the range not deviating from the gist thereof. For example, the aforementioned embodiments were described in detail in order to comprehensibly describe the present invention and are not necessarily limited to those which possess all the above-described configurations. In addition, it is possible to replace part of a configuration of one embodiment with a configuration of another embodiment and it is also possible to add the configuration of another embodiment to the configuration of one embodiment. In addition, it is also possible to add, delete and replace another configuration to, from and with part of one configuration of each embodiment.

For example, the systems of the embodiments are applicable as driving methods for various motors, not limited to the HDD. As specific examples, a DVD reproducing/recording device, a Blu-ray reproducing/recording device and so forth may be given. In addition, it is also possible to apply as a technology for performing more accurate control in an inverter system of an air conditioner and so forth as the case may be.

What is claimed is:

1. A motor drive device comprising:
   drive terminals for three phases which drive a three-phase motor;
   a three-phase driver which includes high-side transistors for three phases which are respectively coupled between the drive terminals for three phases and a high-potential-side power supply voltage and low-side transistors for three phases which are respectively coupled between the drive terminals for three phases and a low-potential-side power supply voltage;
   an output control unit which, in a state where both of the high-side transistor and the low-side transistor for a first phase which is one phase in the three phases are controlled to off-states, controls the high-side transistor and the low-side transistor for at least one phase in a second phase and a third phase which are remaining two phases with PWM signals in a mask term;
   a back electromotive voltage detection unit which detects a drive terminal voltage of the drive terminal for the first phase when a center tap voltage of the three-phase motor is set as a reference as a back electromotive voltage in a PWM on-term that both of the high-side transistor for the second phase and the low-side transistor for the third phase are turned on and asserts a zero-crossing signal in a case where the back electromotive voltage is reduced to zero per PWM period included in the mask term; and
   a PWM fixing unit which monitors the back electromotive voltage and the zero-crossing signal and fixes the high-side transistor for the second phase and the low-side transistor for the third phase to on-states regardless of the PWM period in a first term from a predetermined timing after an amplitude level of the back electromotive voltage becomes smaller than a predetermined threshold amplitude to assertion of the zero-crossing signal, wherein the back electromotive voltage detection unit continuously detects the back electromotive voltage in the first term.

2. The motor drive device according to claim 1,
wherein the PWM fixing unit has
a first analog-to-digital converter which converts the back electromotive voltage to a digital value and
a first digital comparator which compares the digital value from the first analog-to-digital converter with a digital value which corresponds to the predetermined threshold amplitude.

3. The motor drive device according to claim 2,
wherein the PWM fixing unit further has a PWM fixing sequencer which receives a result of comparison by the first digital comparator and the zero-crossing signal and generates a PWM fixing signal which reaches an assertion level in the first term.

4. The motor drive device according to claim 2,
wherein the PWM fixing unit further has a second analog-to-digital converter which converts a current flowing into the three-phase motor into a digital value per the PWM period, and
wherein the first analog-to-digital converter is commonized with the second analog-to-digital converter by providing two not-overlapping conversion terms in a term of the same length as the PWM period.

5. The motor drive device according to claim 1,
wherein the PWM fixing unit has
a digital-to-analog converter which receives the predetermined threshold amplitude as a digital value and converts the digital value into an analog value and
an analog comparator which compares the back electromotive voltage with the analog value from the digital-to-analog converter.

6. The motor drive device according to claim 1,
wherein the predetermined threshold amplitude is determined to a magnitude of "3×Dbemf" or less when a change mount of the back electromotive voltage generated in one PWM period is denoted by "Dbemf".

7. The motor drive device according to claim 6,
wherein the predetermine threshold amplitude is set from the outside of the device in advance.

8. The motor drive device according to claim 6,
wherein the PWM fixing unit has a threshold value setting part which detects the change amount of the back electromotive voltages among the plurality of PWM periods on the basis of the back electromotive voltage that the back electromotive voltage detection unit detects per the PWM period in the mask term and determines the predetermined threshold amplitude on the basis of the detected change amounts concerned.

9. The motor drive device according to claim 1,
wherein the back electromotive voltage detection unit has
a differential amplification circuit which amplifies the drive terminal voltage of the drive terminal for the first phase with the center tap voltage being set as the reference,
a sample and hold circuit which samples and holds an output voltage from the differential amplification circuit in accordance with a sampling signal and
a comparator which generates the zero-crossing signal by comparing the voltage held in the sample and hold circuit with a zero voltage and wherein the sampling signal is asserted in the PWM on-term per the PWM period in the terms except the first term in the mask term and is continuously asserted in the first term.

10. The motor drive device according to claim 9,
wherein the back electromotive voltage detection unit further has
a low-pass filter which filters and then transmits the voltage held in the sample and hold circuit to the comparator and
a bypass switch which bypasses the low-pass filter when controlled to the on-state,
wherein the PWM fixing unit is made to be switchable between validity and invalidity, and
wherein at start-up of the three-phase motor, the PWM fixing unit is invalidated and the bypass switch is controlled to the off-state and at steady rotation of the three-phase motor, the PWM fixing unit is validated and the bypass switch is controlled to the on-state.

11. The motor drive device according to claim 1, further comprising:
a PLL control loop which generates a conduction-use timing signal used for conduction of the three-phase motor and conducts feedback-control of a phase or a frequency of the conduction-use timing signal in such a manner that an assertion timing of the zero-crossing signal is maintained at a specified timing in the mask term which is determined on the basis of the conduction-use timing signal.

12. A motor system comprising:
a disk which stores data;
a three-phase motor which rotates the disk; and
a motor drive device which drives the three-phase motor, wherein the motor drive device has
drive terminals for three phases which drive a three-phase motor,
a three-phase driver which includes high-side transistors for three phases which are respectively coupled between the drive terminals for three phases and a high-potential-side power supply voltage and low-side transistors for three phases which are respectively coupled between the drive terminals for three phases and a low-potential-side power supply voltage,
an output control unit which, in a state where both of the high-side transistor and the low-side transistor for a first phase which is one phase in the three phases are controlled to off-states, controls the high-side transistor and the low-side transistor for at least one phase in a second phase and a third phase which are remaining two phases with PWM signals in a mask term,
a back electromotive voltage detection unit which detects a drive terminal voltage of the drive terminal for the first phase when a center tap voltage of the three-phase motor is set as a reference as a back electromotive voltage in a PWM on-term that both of the high-side transistor for the second phase and the low-side transistor for the third phase are turned on and asserts a zero-crossing signal in a case where the back electromotive voltage is reduced to zero per PWM period included in the mask term and
a PWM fixing unit which monitors the back electromotive voltage and the zero-crossing signal and fixes the high-side transistor for the second phase and the low-side transistor for the third phase to on-states regardless of the PWM period in a first term from a predetermined timing after an amplitude level of the back electromotive voltage becomes smaller than a predetermined threshold amplitude to assertion of the zero-crossing signal and wherein the back electromotive voltage detection unit continuously detects the back electromotive voltage in the first term.

13. The motor system according to claim 12, wherein the PWM fixing unit has a first analog-to-digital converter which converts the back electromotive voltage to a digital value and a first digital comparator which compares the digital value from the first analog-to-digital converter with a digital value which corresponds to the predetermined threshold amplitude.

14. The motor system according to claim 13, wherein the PWM fixing unit further has a PWM fixing sequencer which receives a result of comparison by the first digital comparator and the zero-crossing signal and generates a PWM fixing signal which reaches an assertion level in the first term.

15. The motor system according to claim 12, wherein the PWM fixing unit has a digital-to-analog converter which receives the predetermined threshold amplitude as a digital value and converts the digital value into an analog value and an analog comparator which compares the back electromotive voltage with the analog value from the digital-to-analog converter.

16. The motor system according to claim 12, wherein the predetermined threshold amplitude is determined to a magnitude of "3×Dbemf" or less when a change mount of the back electromotive voltage generated in one PWM period is denoted by "Dbemf".

17. The motor system according to claim 16, wherein the PWM fixing unit has a threshold value setting part which detects the change amount of the back electromotive voltages among the plurality of PWM periods on the basis of the back electromotive voltage that the back electromotive voltage detection unit detects per the PWM period in the mask term and determines the predetermined threshold amplitude on the basis of the detected change amounts concerned.

18. The motor system according to claim 12, wherein the back electromotive voltage detection unit has a differential amplification circuit which amplifies the drive terminal voltage of the drive terminal for the first phase with the center tap voltage being set as the reference, a sample and hold circuit which samples and holds an output voltage from the differential amplification circuit in accordance with a sampling signal and a comparator which generates the zero-crossing signal by comparing the voltage held in the sample and hold circuit with a zero voltage and wherein the sampling signal is asserted in the PWM on-term per the PWM period in the terms except the first term in the mask term and is continuously asserted in the first term.

19. The motor system according to claim 18, wherein the back electromotive voltage detection unit further has a low-pass filter which filters the voltage held in the sample and hold circuit and transmits the held voltage so filtered to the comparator and a bypass switch which bypasses the low-pass filter when controlled to the on-state, wherein the PWM fixing unit is made to be switchable between validity and invalidity, and wherein at start-up of the three-phase motor, the PWM fixing unit is invalidated and the bypass switch is controlled to the off-state and at steady rotation of the three-phase motor, the PWM fixing unit is validated and the bypass switch is controlled to the on-state.

20. The motor system according to claim 12, wherein the disk is a hard disk.

* * * * *